(12) United States Patent
Maloy et al.

(10) Patent No.: US 11,100,075 B2
(45) Date of Patent: Aug. 24, 2021

(54) GRAPHICAL USER INTERFACES FOR INCORPORATING COMPLEX DATA OBJECTS INTO A WORKFLOW

(71) Applicant: ServiceNow, Inc., Santa Clara, CA (US)

(72) Inventors: Christopher Maloy, Payson, UT (US); Lubomir Kostadinov Vardin, Aliso Viejo, CA (US); Akhilesh Kondra, San Jose, CA (US); Joshua Timothy Nerius, Chicago, IL (US); Rebecca Anita Dias, Seattle, WA (US); Jacob Samuel Burman, Carlsbad, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 16/358,205

(22) Filed: Mar. 19, 2019

(65) Prior Publication Data
US 2020/0301902 A1 Sep. 24, 2020

(51) Int. Cl.
*G06F 16/22* (2019.01)
*G06F 16/28* (2019.01)
(Continued)

(52) U.S. Cl.
CPC ........ *G06F 16/2272* (2019.01); *G06F 3/0482* (2013.01); *G06F 16/2246* (2019.01); *G06F 16/287* (2019.01); *G06F 40/174* (2020.01)

(58) Field of Classification Search
CPC .. G06F 16/2272; G06F 9/4488; G06F 16/287; G06F 16/2246; G06F 40/174; G06F 3/0482
(Continued)

(56) References Cited

U.S. PATENT DOCUMENTS

| | | | | |
|---|---|---|---|---|
| 6,018,741 A | * | 1/2000 | Howland | G06F 16/9027 707/696 |
| 6,240,422 B1 | * | 5/2001 | Atkins | H04M 15/00 719/315 |

(Continued)

OTHER PUBLICATIONS

"ServiceNow London IT Operations Management", ServiceNow Docs, Mar. 12, 2019, 88 pages.
(Continued)

*Primary Examiner* — Ashish Thomas
*Assistant Examiner* — Nargis Sultana
(74) *Attorney, Agent, or Firm* — Fletcher Yoder PC

(57) ABSTRACT

A computational instance of a remote network management platform may include persistent storage and one or more processors. The persistent storage may contain a recursively-defined complex data object, and one or more processors may be configured to: (i) transmit a depiction of a graphical user interface including a visual representation of the recursively-defined complex data object, where the complex data object as well as each array and object therein is represented as a collapsible menu item that can either display or hide its elements; (ii) receive a modification to an element of the complex data object, wherein the modification is either removal of the element, addition of the element, or a change to the associated type of the element; (iii) update the persistent storage to represent the complex data object as modified; and (iv) transmit an update to the visual representation that reflects the complex data object as modified.

16 Claims, 26 Drawing Sheets

(51) Int. Cl.
*G06F 3/0482* (2013.01)
*G06F 40/174* (2020.01)

(58) Field of Classification Search
USPC .......................................................... 707/696
See application file for complete search history.

(56) References Cited

U.S. PATENT DOCUMENTS

| | | | |
|---|---|---|---|
| 6,609,122 B1 | 8/2003 | Ensor | |
| 7,028,301 B2 | 4/2006 | Ding | |
| 7,062,683 B2 | 6/2006 | Warpenburg | |
| 7,131,037 B1 | 10/2006 | LeFaive | |
| 7,170,864 B2 | 1/2007 | Matharu | |
| 7,350,209 B2 | 3/2008 | Shum | |
| 7,610,512 B2* | 10/2009 | Gerber | G06F 11/0709 714/26 |
| 7,617,073 B2* | 11/2009 | Trinon | G06F 11/008 702/183 |
| 7,689,628 B2* | 3/2010 | Garg | G06F 11/3495 707/793 |
| 7,890,802 B2 | 2/2011 | Gerber | |
| 7,930,396 B2* | 4/2011 | Trinon | H04L 41/5054 709/224 |
| 7,945,860 B2 | 5/2011 | Vambenepe | |
| 7,966,398 B2* | 6/2011 | Wiles, Jr. | H04L 67/02 709/224 |
| 8,051,164 B2 | 11/2011 | Peuter | |
| 8,176,183 B2* | 5/2012 | Bar-Yaacov | H04L 69/16 709/227 |
| 8,224,683 B2* | 7/2012 | Manos | G06Q 10/063114 705/7.15 |
| 8,266,096 B2* | 9/2012 | Navarrete | G06Q 10/06 707/600 |
| 8,457,928 B2 | 6/2013 | Dang | |
| 8,478,569 B2 | 7/2013 | Scarpelli | |
| 8,674,992 B2 | 3/2014 | Poston | |
| 8,689,241 B2* | 4/2014 | Naik | G06F 11/0781 719/318 |
| 8,743,121 B2 | 6/2014 | De Peuter | |
| 8,887,133 B2* | 11/2014 | Behnia | G06F 8/70 717/120 |
| 9,239,857 B2* | 1/2016 | Trinon | G06F 16/248 |
| 9,535,737 B2 | 1/2017 | Joy | |
| 9,792,387 B2* | 10/2017 | George | H04L 67/10 |
| 10,101,972 B1* | 10/2018 | Nelson | G06F 8/20 |
| 10,198,698 B2* | 2/2019 | Jayaraman | G06N 7/005 |
| 10,209,983 B2* | 2/2019 | Norris | G06F 9/455 |
| 10,225,160 B1* | 3/2019 | Polinati | G06F 16/285 |
| 2001/0045965 A1* | 11/2001 | Orbanes | G06F 3/0346 715/841 |
| 2003/0218639 A1* | 11/2003 | Lee | G06F 3/0481 715/853 |
| 2004/0060003 A1* | 3/2004 | Mani | G06F 40/143 715/234 |
| 2005/0160359 A1* | 7/2005 | Falk | G06F 40/143 715/239 |
| 2005/0171970 A1* | 8/2005 | Ozzie | G06F 16/986 |
| 2005/0171980 A1* | 8/2005 | Fernandez | G06F 16/258 |
| 2005/0188349 A1* | 8/2005 | Bent | G06F 8/38 717/106 |
| 2006/0074732 A1* | 4/2006 | Shukla | G06Q 10/06 717/106 |
| 2007/0073712 A1* | 3/2007 | Falk | G06F 16/26 |
| 2007/0088740 A1* | 4/2007 | Davies | G06F 9/4488 |
| 2007/0101322 A1* | 5/2007 | Muschett | G06F 16/986 717/168 |
| 2009/0287737 A1* | 11/2009 | Hammerly | G06F 16/288 |
| 2010/0037095 A1* | 2/2010 | Gerber | G06F 11/0709 714/15 |
| 2010/0057760 A1* | 3/2010 | Demant | G06F 16/86 707/E17.044 |
| 2010/0306638 A1* | 12/2010 | Oleksy | G06F 3/04842 715/221 |
| 2011/0113020 A1* | 5/2011 | Pulleyn | H04L 61/15 707/696 |
| 2012/0131556 A1* | 5/2012 | Mathur | G06F 11/3668 717/125 |
| 2013/0343226 A1* | 12/2013 | Holmes | H04B 7/2643 370/254 |
| 2014/0026024 A1* | 1/2014 | Kimber | G06F 40/174 715/224 |
| 2014/0244692 A1* | 8/2014 | Williamson | G06F 40/143 707/791 |
| 2015/0100627 A1* | 4/2015 | Benke | G06F 16/88 709/203 |
| 2015/0193480 A1* | 7/2015 | Fischer | G06F 16/213 707/809 |
| 2015/0261729 A1* | 9/2015 | Davis | G06F 40/151 715/234 |
| 2016/0004544 A1* | 1/2016 | Paraschivescu | G06F 3/04842 715/744 |
| 2016/0321381 A1* | 11/2016 | English | G06F 30/20 |
| 2017/0329461 A1* | 11/2017 | Schikora | G06F 16/211 |
| 2018/0123940 A1* | 5/2018 | Rimar | H04L 45/02 |
| 2018/0321654 A1* | 11/2018 | Tucker | G06Q 10/0633 |
| 2019/0065456 A1* | 2/2019 | Platow | G06F 40/106 |

OTHER PUBLICATIONS

"ServiceNow London Platform Capabilities", ServiceNow Docs, Mar. 12, 2019, 354 pages.
Nelson, U.S. Appl. No. 16/133,438, filed Sep. 17, 2018, 43 pages.

* cited by examiner

| Offboarding | Status: Draft | App: User Management | Edit | Test | Copy | Save | Activate |

| | State | Start time | Duration |
|---|---|---|---|
| Action | | | |
| 1. Look up records in [sc_request] when requested for is Trigger->[sys_user] Record | Complete | 09:08:15 | 120ms |
| 2. For each item in 1->[sc_request] Records | Complete | 09:08:15 | 2195ms |
| 2.1. Update 2->[sc_request] Record (Request state->Closed cancelled, Comments->"User no longer with company") | Complete | 09:08:16 | 796ms |
| Action | | | |
| 3. Look up records in [task] when assigned to is Trigger->[sys_user] Record | Complete | 09:08:17 | 43ms |
| 4. For each item in 3->[task] Records | Complete | 09:08:17 | 338ms |
| 4.1. Update 4->[task] Record (Assigned to->Trigger->[sys_user]->Manager) | Complete | 09:08:17 | 70ms |

FIG. 7A

XML DATA 700

```
<?xml version="1.0" encoding="UTF-8"?>
<users>
  <user>
    <name1>John</name1>
    <name2>Smth</name2>
    <telephones>
      <telephone type="home">888-555-1000</telephone>
      <telephone type="office">888-555-1001</telephone>
      <telephone type="mobile">888-555-1002</telephone>
    </telephones>
    <address>
      <street>123 Grand Ave.</street>
      <city>Chicago</city>
      <state>IL</state>
      <zip>60606</zip>
    </address>
  </user>
</users>
```

XPATHS 702

/users/
/users/user
/users/user/name1
/users/user/name2
/users/user/telephones
/users/user/telephones/telephone
/users/user/telephones/telephone
/users/user/telephones/telephone
/users/user/address
/users/user/address/street
/users/user/address/city
/users/user/address/state
/users/user/address/zip

1000 — TRANSMIT, TO A CLIENT DEVICE, A DEPICTION OF A GRAPHICAL USER INTERFACE, WHEREIN THE DEPICTION OF THE GRAPHICAL USER INTERFACE INCLUDES A VISUAL REPRESENTATION OF A RECURSIVELY-DEFINED COMPLEX DATA OBJECT, WHEREIN ELEMENTS OF THE RECURSIVELY-DEFINED COMPLEX DATA OBJECT EACH HAVE ASSOCIATED NAMES AND ASSOCIATED TYPES, WHEREIN THE ASSOCIATED TYPES ARE EITHER A STRING, AN ARRAY OF IDENTICAL ELEMENTS, OR AN OBJECT OF TWO OR MORE ELEMENTS, WHEREIN THE RECURSIVELY-DEFINED COMPLEX DATA OBJECT AS WELL AS EACH ARRAY AND OBJECT THEREIN IS REPRESENTED AS A COLLAPSIBLE MENU ITEM THAT CAN EITHER DISPLAY OR HIDE ITS ELEMENTS, AND WHEREIN EACH DISPLAYED ELEMENT SHOWS ITS ASSOCIATED DESCRIPTION AND ASSOCIATED TYPE

1002 — RECEIVE, FROM THE CLIENT DEVICE AND BY WAY OF THE GRAPHICAL USER INTERFACE, A MODIFICATION TO AN ELEMENT OF THE RECURSIVELY-DEFINED COMPLEX DATA OBJECT, WHEREIN THE MODIFICATION IS EITHER REMOVAL OF THE ELEMENT, ADDITION OF THE ELEMENT, OR A CHANGE TO THE ASSOCIATED TYPE OF THE ELEMENT

1004 — UPDATE PERSISTENT STORAGE TO REPRESENT THE RECURSIVELY-DEFINED COMPLEX DATA OBJECT AS MODIFIED

1006 — TRANSMIT, TO THE CLIENT DEVICE, AN UPDATE TO THE VISUAL REPRESENTATION THAT REFLECTS THE RECURSIVELY-DEFINED COMPLEX DATA OBJECT AS MODIFIED

FIG. 10

GRAPHICAL USER INTERFACES FOR INCORPORATING COMPLEX DATA OBJECTS INTO A WORKFLOW

BACKGROUND

Markup language documents contain text including strings representing content, as well as syntactic tags that are distinguishable from the strings. The tags can describe what the associated strings mean or represent. Thus, a markup language document exhibits a self-describing structure, which simplifies its interpretation, parsing, and/or transformation. Examples of markup languages include the HyperText Markup Language (HTML), eXtensible Markup Language (XML), and the Standard Generalized Markup Language (SGML).

Use of markup languages first became popular with the adoption of HTML as the de facto standard for World-Wide Web document encoding. But markup language documents can be used to encode information in virtually any context where complex data objects are to be passed between two or more software applications or devices. Parsing markup language documents, however, and storing the resulting output in a database or file, is often a challenging and error-prone task requiring manual coding of the parser.

SUMMARY

The embodiments herein provide for a graphical user interface (GUI) based mechanism for defining a complex data object, as well as its relation to tag paths (also referred to as "paths") within a markup language document. By providing these features as an interactive experience, a user need not go through the painstaking effort of coding a software-based parser for each and every markup language document that he or she wishes to map to the complex data object. Instead, the user defines the complex data object, and associates its elements with tag paths indicating fields of the markup language document. Thus, the markup language document can be parsed automatically by converting its paths of interest to a tree structure, and then from the tree structure to the complex data object. Other parsing procedures may exist.

Further, the complex data object can be automatically defined by an example markup language document. For instance, an XML document with tags and content of interest can be parsed and the tagged data therein mapped to a tree structure. This tree structure can, in turn, be used as the definition of the complex data object. In other words, rather than manually defining a complex data object, one may be derived from an instance of markup language.

These two features, alone or in combination, dramatically reduce the amount of time that a user needs to spend on customizing an application to be able to process markup language. This is particularly advantageous where the application uses information returned from various representational state transfer (REST) or Simple Object Access Protocol (SOAP) interface calls, where each such interface may return data in different structured formats.

Notably, even though the embodiments herein focus on markup languages, XML in particular, these embodiments may operate similarly with any structured data format, such as JavaScript Object Notation (JSON), YAML Ain't Markup Language (YAML), and so on.

Accordingly, a first example embodiment may involve a computational instance of a remote network management platform. The computational instance may include persistent storage containing a recursively-defined complex data object, where elements therein each have associated names and associated types, where the associated types are either a string, an array of identical elements, or an object of two or more elements. The computational instance may further include one or more processors configured to: (i) transmit, to a client device associated with a managed network, a depiction of a graphical user interface, where the computational instance is dedicated to the managed network, where the depiction of the graphical user interface includes a visual representation of the recursively-defined complex data object, where the recursively-defined complex data object as well as each array and object therein is represented as a collapsible menu item that can either display or hide its elements, and where each displayed element shows its associated description and associated type; (ii) receive, from the client device and by way of the graphical user interface, a modification to an element of the recursively-defined complex data object, where the modification is either removal of the element, addition of the element, or a change to the associated type of the element; (iii) update the persistent storage to represent the recursively-defined complex data object as modified; and (iv) transmit, to the client device, an update to the visual representation that reflects the recursively-defined complex data object as modified.

A second example embodiment may involve transmitting, by a server device and to a client device, a depiction of a graphical user interface, where the depiction of the graphical user interface includes a visual representation of a recursively-defined complex data object, where elements of the recursively-defined complex data object each have associated names and associated types, where the associated types are either a string, an array of identical elements, or an object of two or more elements, where the recursively-defined complex data object as well as each array and object therein is represented as a collapsible menu item that can either display or hide its elements, and where each displayed element shows its associated description and associated type. The second example embodiment may further involve receiving, by the server device and by way of the graphical user interface, a modification to an element of the recursively-defined complex data object, where the modification is either removal of the element, addition of the element, or a change to the associated type of the element. The second example embodiment may further involve updating, by the server device, persistent storage to represent the recursively-defined complex data object as modified. The second example embodiment may further involve transmitting, by the server device and to the client device, an update to the visual representation that reflects the recursively-defined complex data object as modified.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIGS. 6A, 6B, 6C, 6D, 6E, 6F, 6G, 6H, 6I, 6J, and 6K depict workflow design tool graphical user interfaces, in accordance with example embodiments.

FIG. 7A depicts XML data and associated XPaths, in accordance with example embodiments.

FIG. 10 is a flow chart, in accordance with example embodiments.

DETAILED DESCRIPTION

Figure 1:
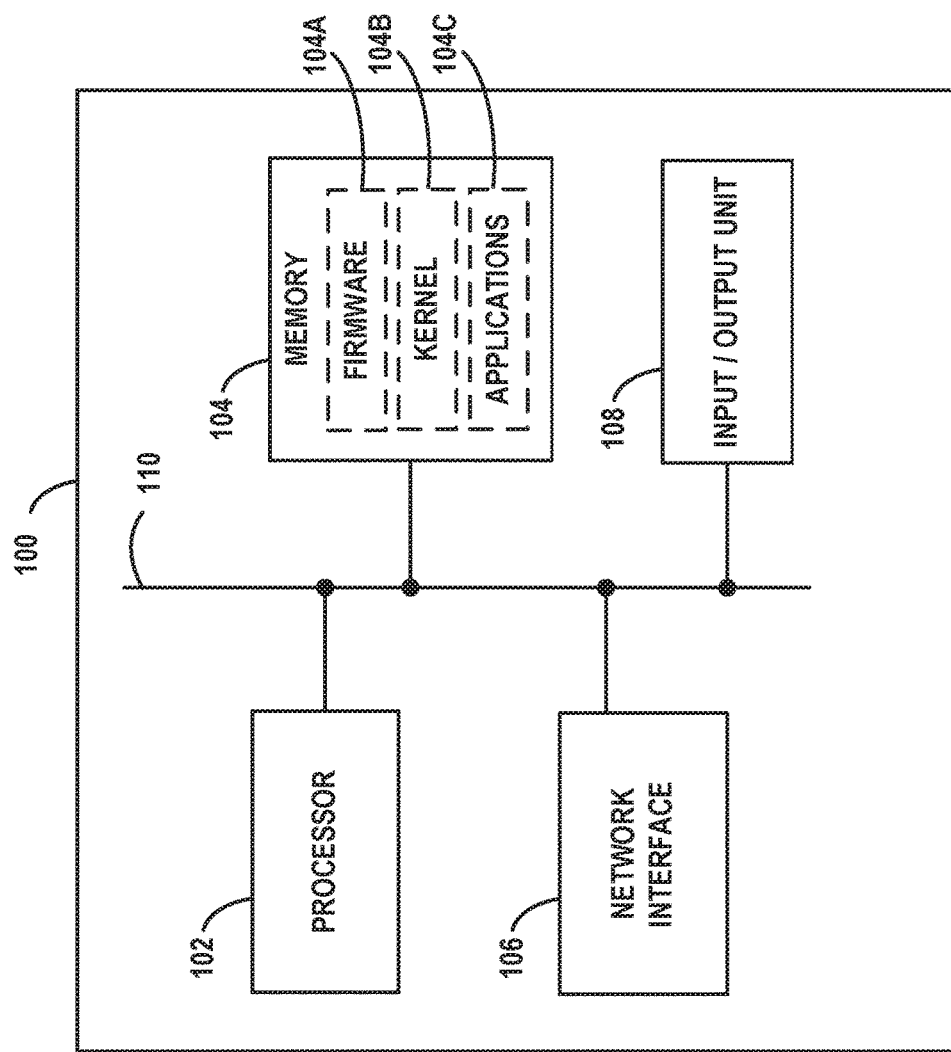
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
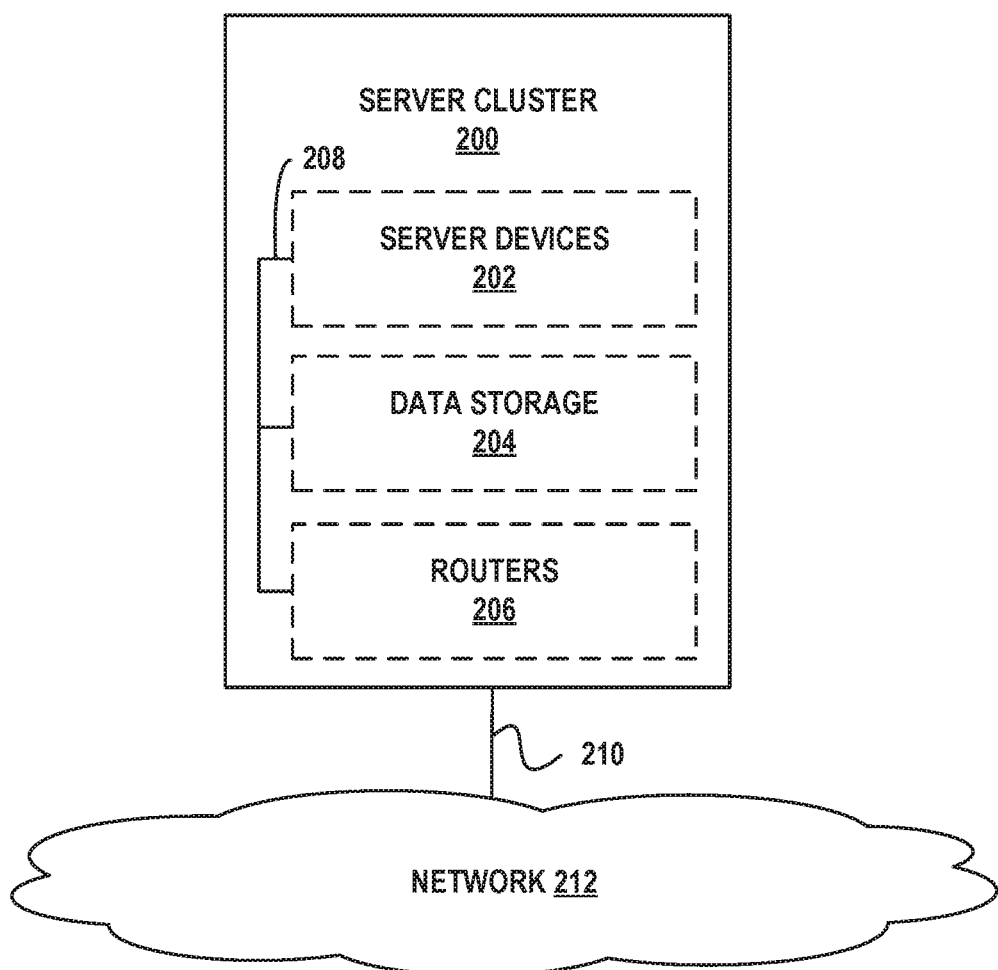
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages.

III. Example Remote Network Management Architecture

Figure 3:
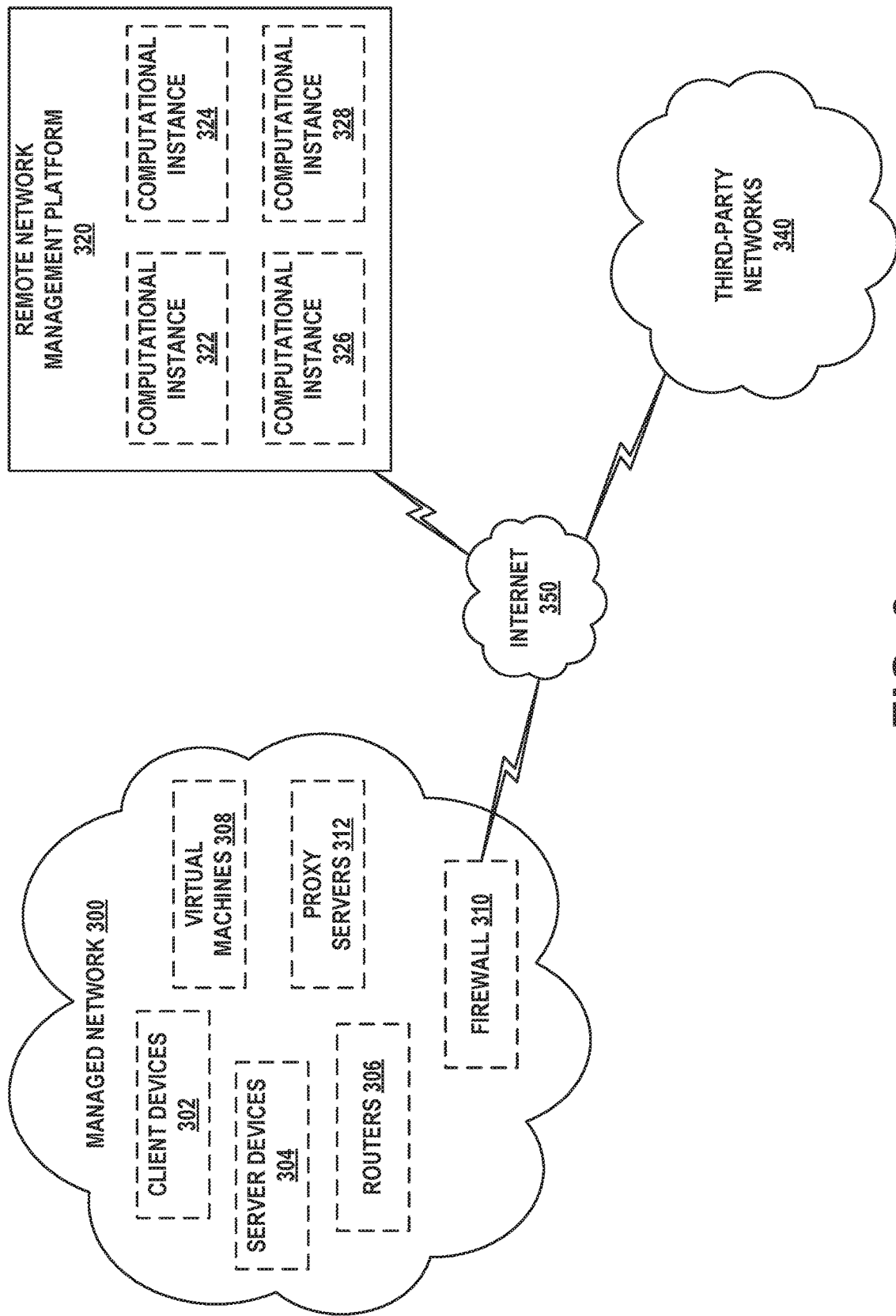
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® AZURE®. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
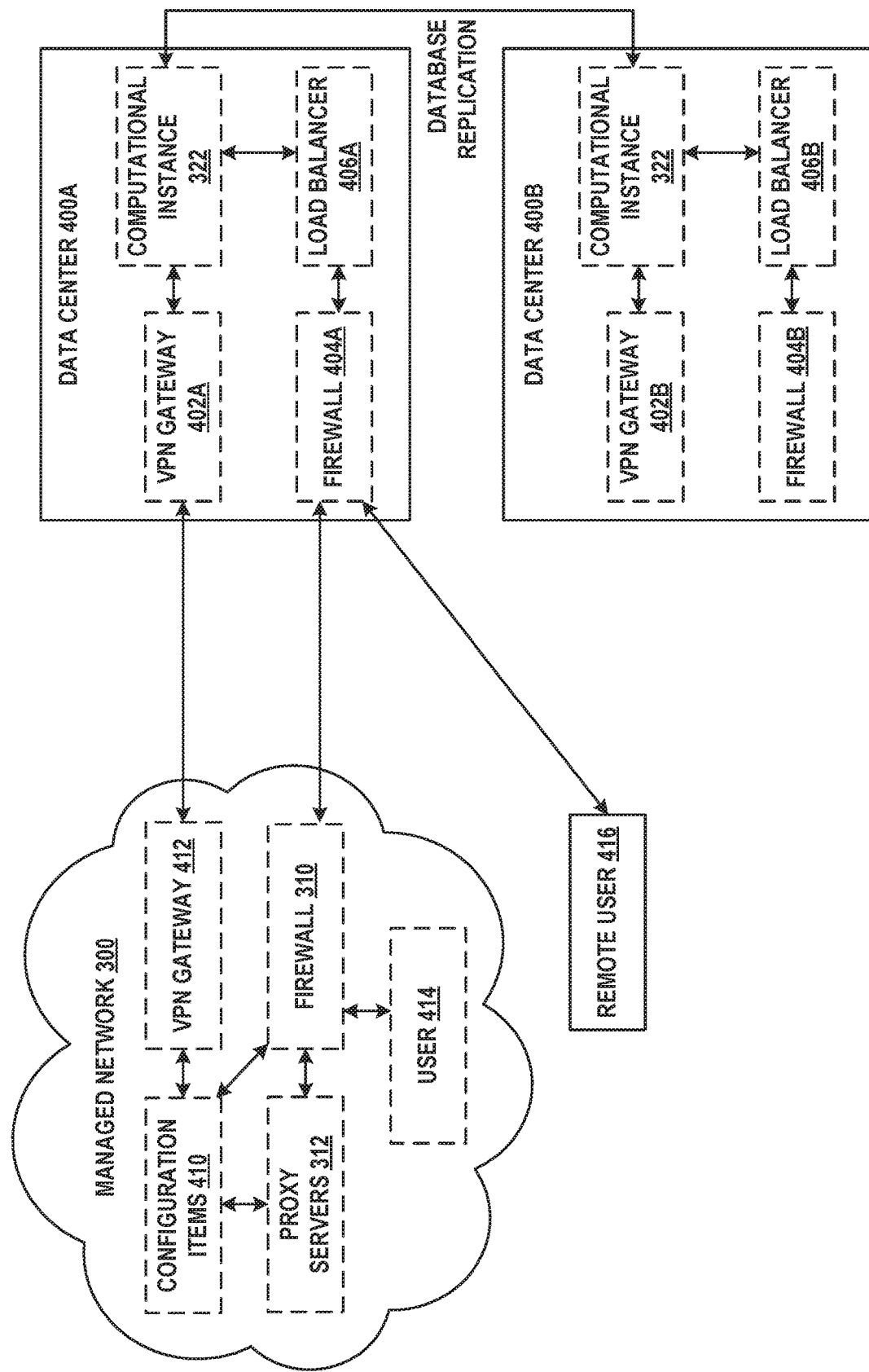
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items

410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
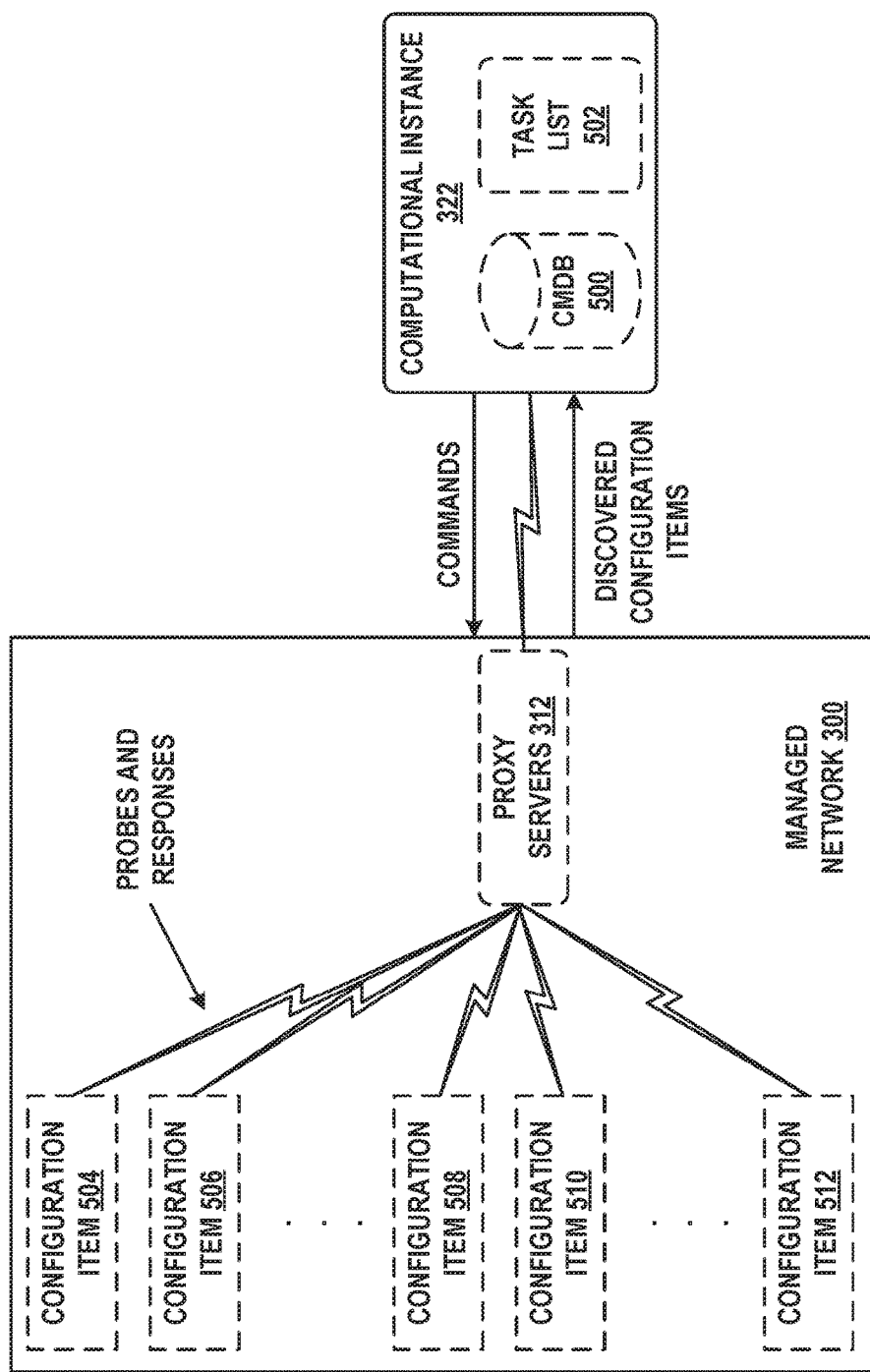
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
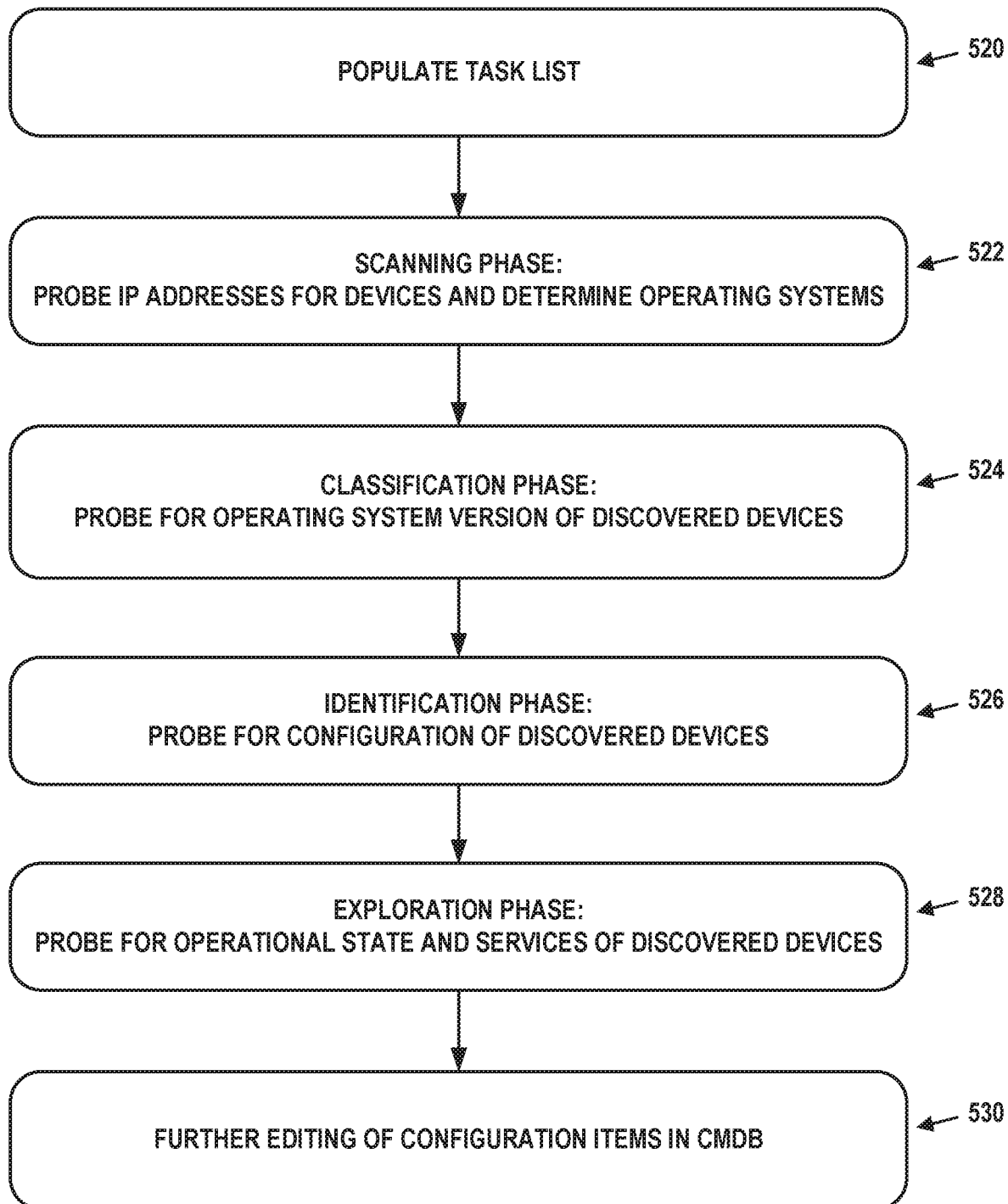
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. Example Workflow Design Tool

Computational instances of the remote network management platform discussed herein may enable the specification and execution of workflows on behalf of their respective managed networks. A workflow is a specific sequence or series of tasks that, when performed, accomplish one or more goals. In some cases, workflows may be represented as flow charts, with one or more starting states, intermediate states, and ending states connected by various transitions therebetween. Some states may be visited zero times or more than one time. Also, some states may have more than one possible next state, thus representing a decision to be made in the workflow, either based on user input, automated input, information stored in a database, or by way of other mechanisms. Triggers may also be defined that cause certain transitions between states, input to be acquired, or output to be produced.

Such a workflow can be implemented on a computational instance through use of a software-based workflow design tool. Such a tool presents the workflow designer with options for defining the states, transitions, triggers, actions, input data, output data, and other characteristics of the workflow. The tool may utilize a GUI, and may be embodied as a series of one or more web pages and/or web-based applications deployed upon the computational instance. Once completed and released, employees of the managed network may make use of the workflow to carry out various tasks in an organized and efficient fashion. Notably, the workflow design tool can be a so-called "low-code/no-code" solution, with which designers either write very little program code, or no code at all, to implement the workflow.

While the embodiments herein provide support for general workflow design, an example workflow design tool may be implemented based around specific definitions of triggers, actions, and workflow logic. Triggers may be used to specify conditions that start a workflow, such as a change to an entry in a database (e.g., the addition or updating of a configuration item in a CMDB) or according to a schedule (e.g., once per day or once per week). A trigger causes one or more actions to be performed, and each action may be controlled by workflow logic that specifies the conditions that must be true for the action to be performed. The action may involve changing the state of information in a database, sending a notification (e.g., an email) to a user, and so on.

In some cases, sub-flows may be defined and incorporated into a workflow. A sub-flow may be an automated or semi-automated process including a sequence of reusable actions and specific data inputs that allow it to be started from within a flow, another sub-flow, or script. Thus, sub-flows can be applied to multiple workflows.

As an illustrative example of a workflow, consider an employee offboarding scenario, in which an employee has left an enterprise for some reason (e.g., the employee quit, got fired, passed away, etc.). The goals of the workflow are to: (i) look up and cancel any pending catalog requests (e.g., equipment requisitions) opened by the departed employee, and (ii) reassign any open tasks (e.g., pending approvals, units of work that are to be accomplished) assigned to the departed employee to his or her manager. In various embodiments, more or fewer goals may be present.

Figure 6A:
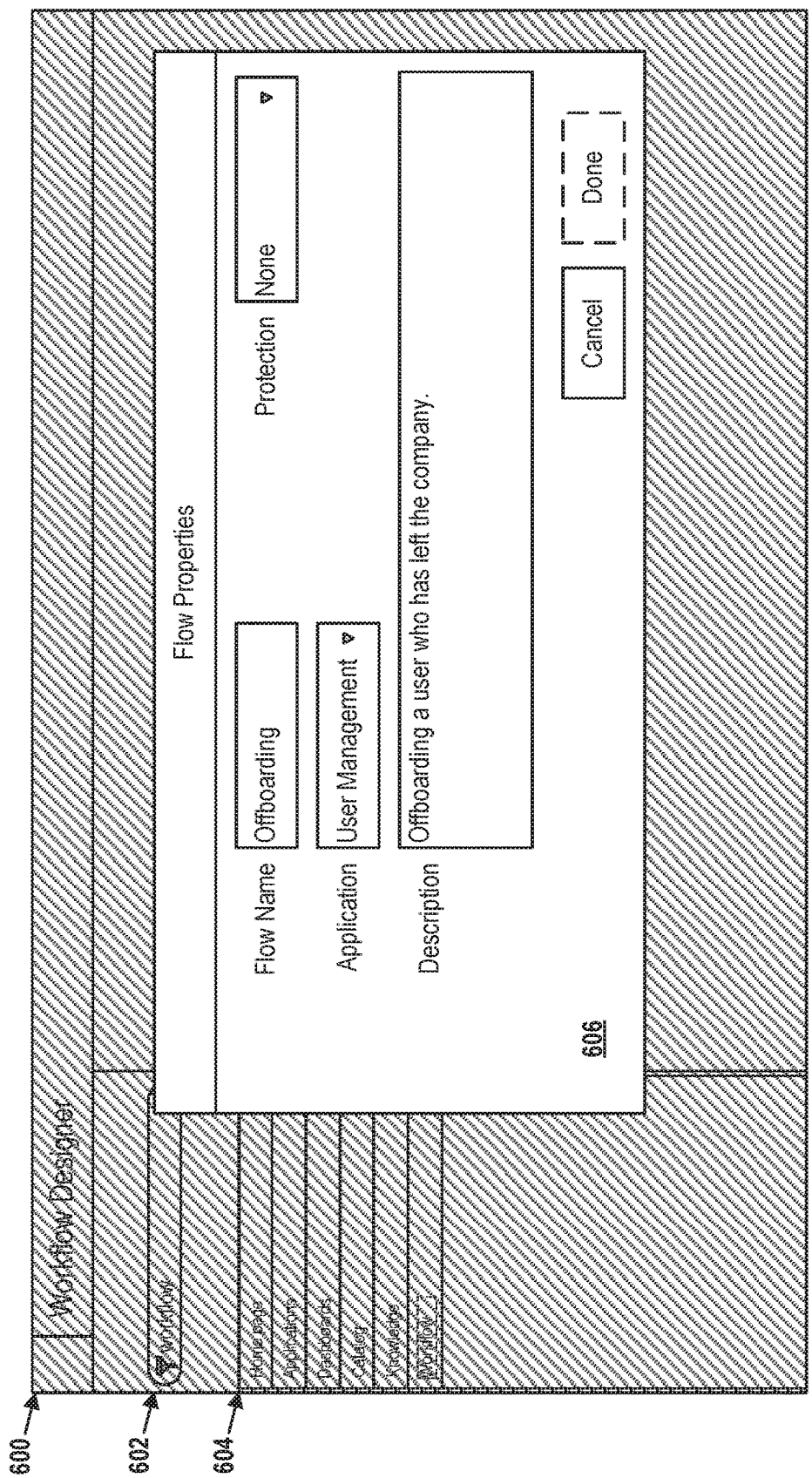

The workflow design tool may present the designer with a series of GUI pages that allow the designer to specify the workflow. Examples of such pages are shown in FIGS. 6A-6J, while results of an automated test of the workflow are shown in FIG. 6K. Notably, these examples are merely for purposes of illustration and not intended to be limiting. The workflow design tool may be able to provide other GUIs including alternative arrangements of information usable for designing workflows.

FIG. 6A depicts GUI 600. The background of GUI 600 shows a web-based menu for selecting features and/or applications supported by a computational instance. This background is denoted as such by hash marks.

For example, GUI 600 includes dialog box 602 in which a user has entered the search term "workflow". This selects the workflow design tool from the bottom of menu 604. This selection is reflected by the text "Workflow Designer" appearing at the top of GUI 600.

GUI 600 also includes pop up window 606. Alternatively, window 606 may be a pane overlaid on top of GUI 600 and not a separate window. Regardless, window 606 allows a user to initiate creation of a new workflow by specifying its properties. In GUI 600, these properties are the workflow's name "Offboarding", the workflow's scoped application "User Management", the workflow's description "Offboarding a user who has left the company", and whether the workflow is to be protected. In alternative embodiments more or fewer properties may be specified.

The workflow's name may be free-form text entered by the user. The workflow's scoped application may be selected from a drop-down menu of applications or specified as global. As the workflow in GUI 600 is limited to the "User Management" scoped application, this workflow may be considered to be part of this application. The workflow's description may also be free-form text. The workflow's protection specifies whether it is modifiable ("none") or read-only ("read-only") by other workflow designers or users.

Once the user is satisfied with the information entered in window 606, the user may select or otherwise activate the "Done" button. This selection is denoted in FIG. 6A by this button being depicted with a dashed line. Once the user completes the dialog of window 606, the next phase of the workflow design tool, which allows the user to specify a trigger, may be displayed.

Figure 6B:
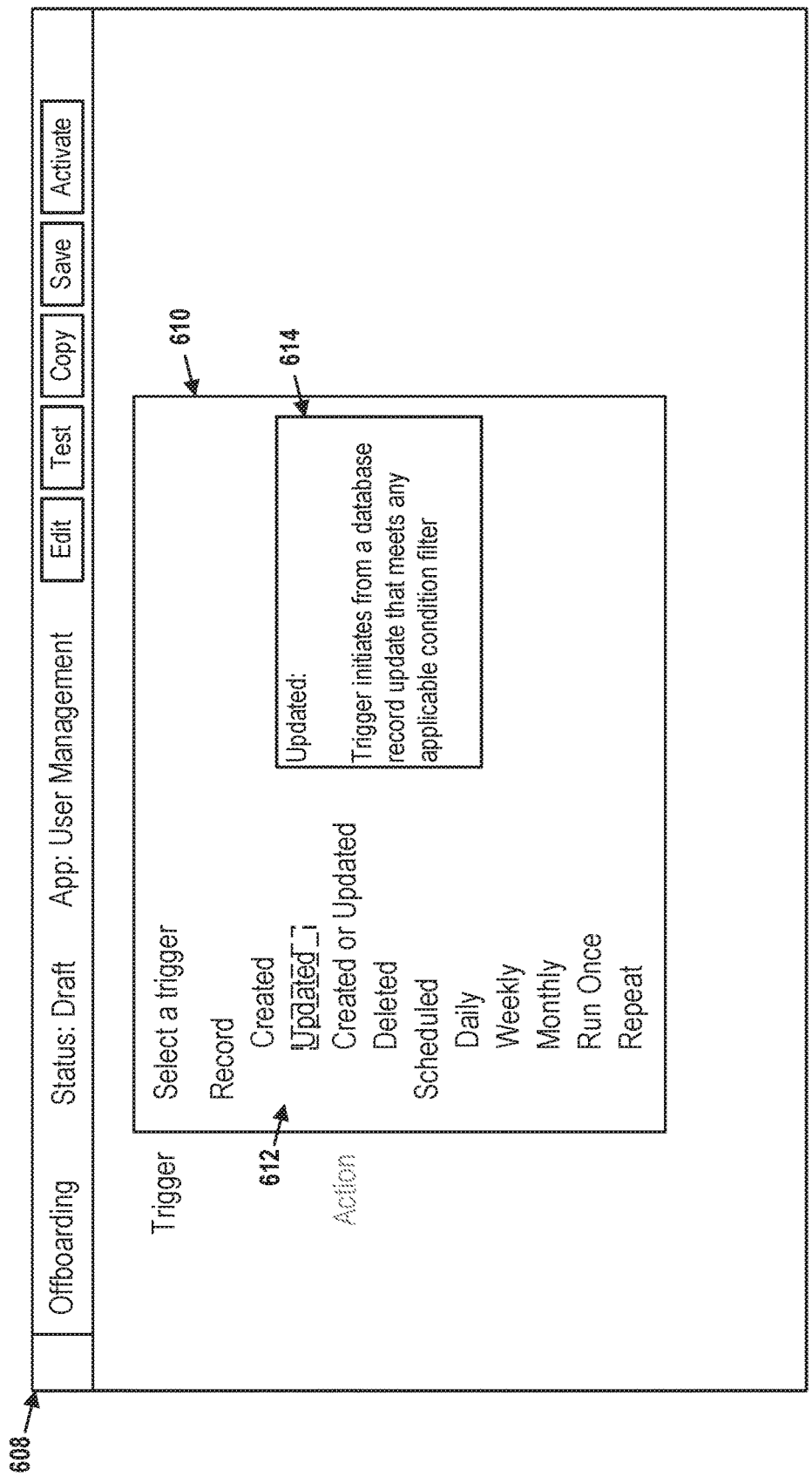

FIG. 6B depicts the first part of the trigger specification phase in GUI 608. The top of GUI 608 specifies the workflow's name, "Offboarding", as entered into window 606. This section of GUI 608 also indicates that this workflow is currently in draft form and is part of the "User Management" scoped application. GUI 608 further displays a series of buttons that allow a user to edit, test, copy, save, and activate the workflow, respectively. In alternative embodiments, different types of information about the workflow may be displayed, and there may be more or fewer buttons potentially with different functionality.

Notably, hashmarks are omitted from the background of GUI 608 (as well as all further GUIs) for purposes of readability. Also, the word "Trigger" is shown in a regular, dark color to indicate that a trigger is being specified, while the word "Action" is shown in a lighter color to indicate that action specification is not taking place.

Pop up window 610 (which, like window 606, may be a pane overlaid on top of GUI 608 and not a separate window), may allow a user to specify a trigger for the workflow. As noted previously, two main types of triggers may be supported and these types are shown in menu 612. Record-based triggers may cause a workflow to be performed when a change to one or more specific database records occurs. As depicted in menu 612, these changes may include creation of a record, updating of a record, creation or updating of a record, and deletion of a record. Scheduled triggers may cause a workflow to be performed at one or more specified times. As depicted in menu 612, such a schedule may trigger a workflow daily, weekly, monthly, just once (at a specified time), or to repeat at a user-specified interval.

In FIG. 6B, menu 612 indicates, with a dashed line, that the user has selected a trigger for when a record is updated. This may cause information box 614, which explains the behavior of the selected trigger, to be displayed.

Figure 6C:
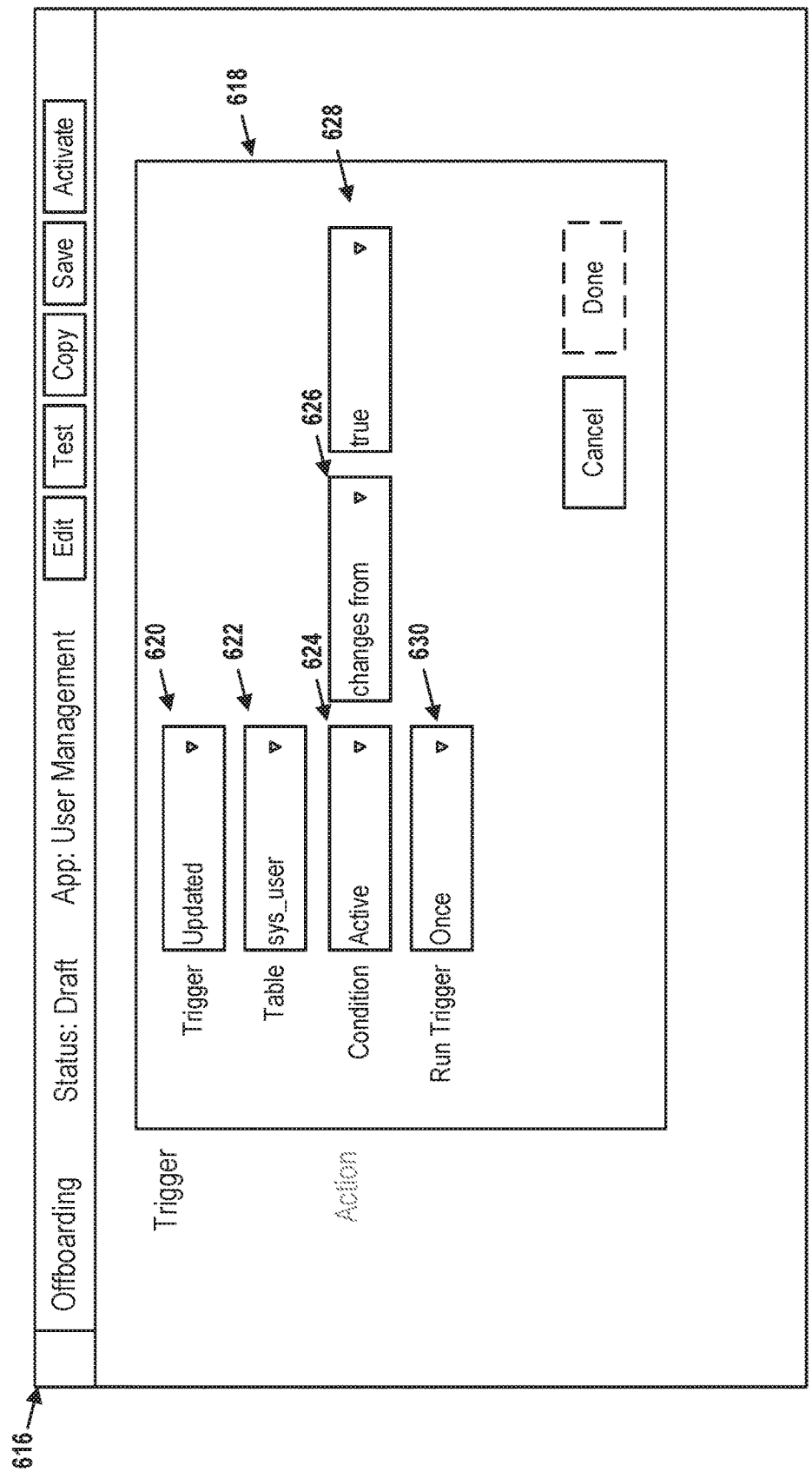

FIG. 6C depicts the second part of the trigger specification phase in GUI 616. GUI 616 assumes that the selection shown in FIG. 6B has been finalized. Thus, GUI 616 depicts pop up window 618 (which, like window 606, may be a pane overlaid on top of GUI 616 and not a separate window), that may allow a user to further specify a trigger for the workflow.

Window 618 contains a number of drop-down menus, some of which may be automatically populated based on the user's selection(s) from GUI 608. Particularly, trigger menu 620 may be populated to reflect the user's selection of the "Updated" option, and run trigger menu 630 may be populated to reflect that record-based triggers are expected to just run once. Nonetheless, the user may modify these selections in window 618.

Table menu 622 allows the user to specify a database table in which records can be found. As shown, this table is sys_user, which is assumed to contain one entry for each employee in the company. Table menu 622 may be capable of displaying a list of one or more available tables.

Condition menus 624, 626, and 628 allow the user to specify a condition of records in the selected table that will cause the workflow to be performed. This condition may be a state or a transition. For instance, condition menu 624 specifies "Active" to indicate that the records must be active, condition menu 626 specifies "changes from" to indicate records that change from active, and condition menu 628 specifies "true" to indicate any record that changes from active to another state.

In various embodiments, condition menu 624 may include entries for various fields in the sys_user table. These fields may include the phone number, building, city, department, address, manager, role, and so on. Condition menu 626 may include entries for "is", "is not", "is empty", "is not empty", "is anything", "is same as", "is different from" "changes", "changes from", "changes to", and/or various other logical operations. Condition menu 628 may include entries for items that are contextually based on the selections made for condition menus 624 and 626.

Viewed as a whole, the trigger specification of window 618 indicates that the workflow is to be performed once when any entry in the sys_user table is updated from active to another state (e.g., inactive). This would indicate that the user is no longer an active employee of the company.

Figure 6D:
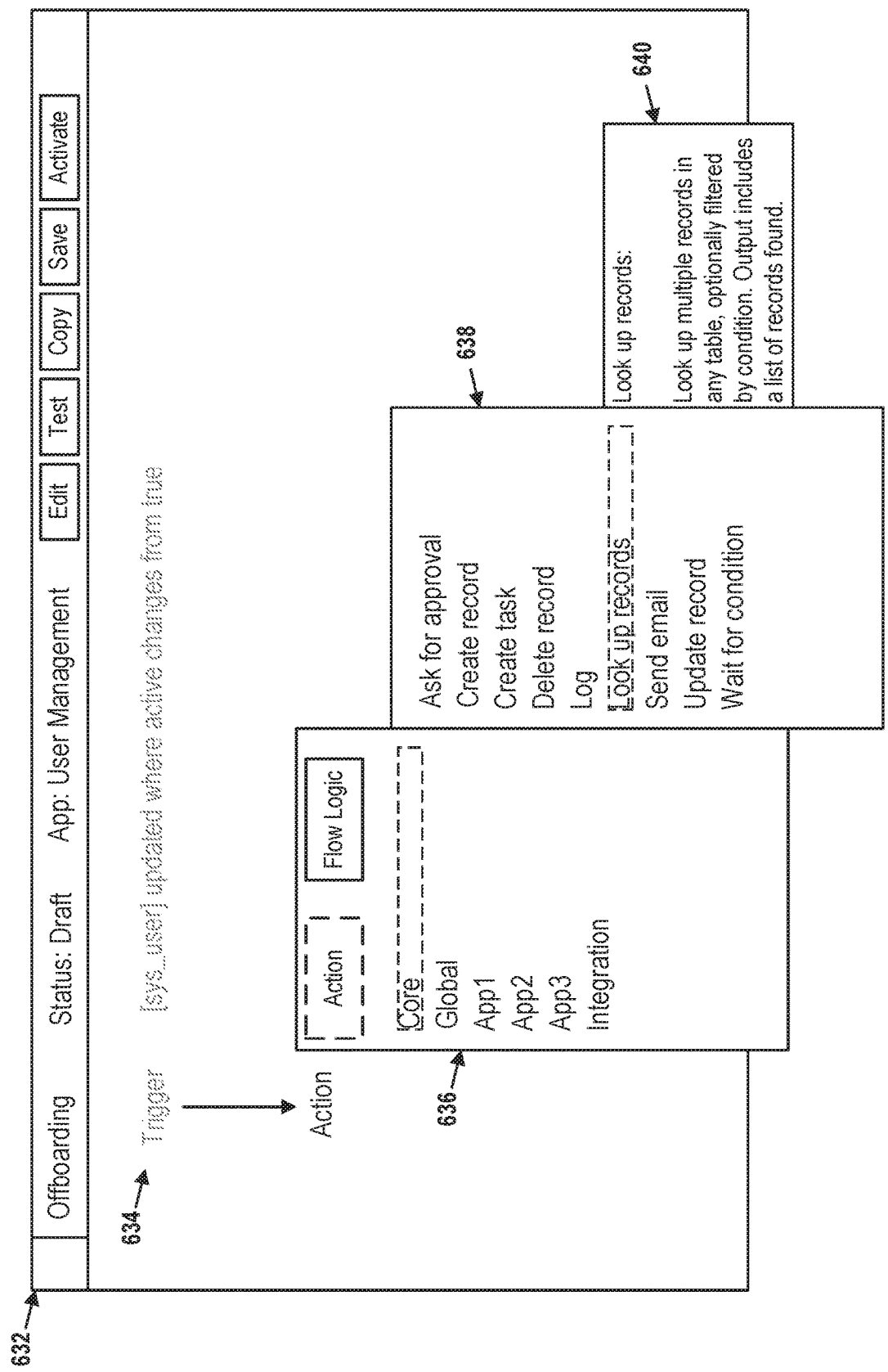

FIG. 6D depicts the first part of an action specification in GUI 632. Notably, at 634, the word "Trigger" is accompanied by a description of the trigger specified in FIGS. 6B and 6C. Further, this text is grayed in order to indicate that the trigger is no longer being specified.

As shown in menu 636, the user has the option of specifying an action or flow logic. The dashed line around the "Action" button indicates that an action is being specified. Particularly, menu 636 displays several contexts for the action being specified. For example, "Core" actions are supported by the computational instance as a default, while "Global" actions include all core actions, application-based, and integration-based actions. Application-based actions, "App1", "App2", and "App3", are actions supported by respective applications built on top of the remote network management platform. These may include, for example, various types of IT service management, IT operations management, customer service management, security operations, and CRM applications. Integration-based actions include actions defined by or supported by third-party applications integrated with the remote network management platform. These may include, for example, virtual chat applications, messaging applications, and so on. Each of these built-in or third-party applications may explicitly expose interfaces (referred to as "spokes") to the workflow design tool so that the workflow design tool can support workflows including data and/or functionality of these applications.

In FIG. 6D, the user has selected the "Core" context. Based on this selection, sub-menu 638 is displayed. This sub-menu provides the user the ability to select from a number of specific actions, such as "Ask for approval", "Create record", "Create task", "Delete record", "Log", "Look up records", "Send email", "Update record", and "Wait for condition". From these, the user has selected "Look up records". Accordingly, information box 640, that describes the selected action, may be displayed.

Figure 6E:
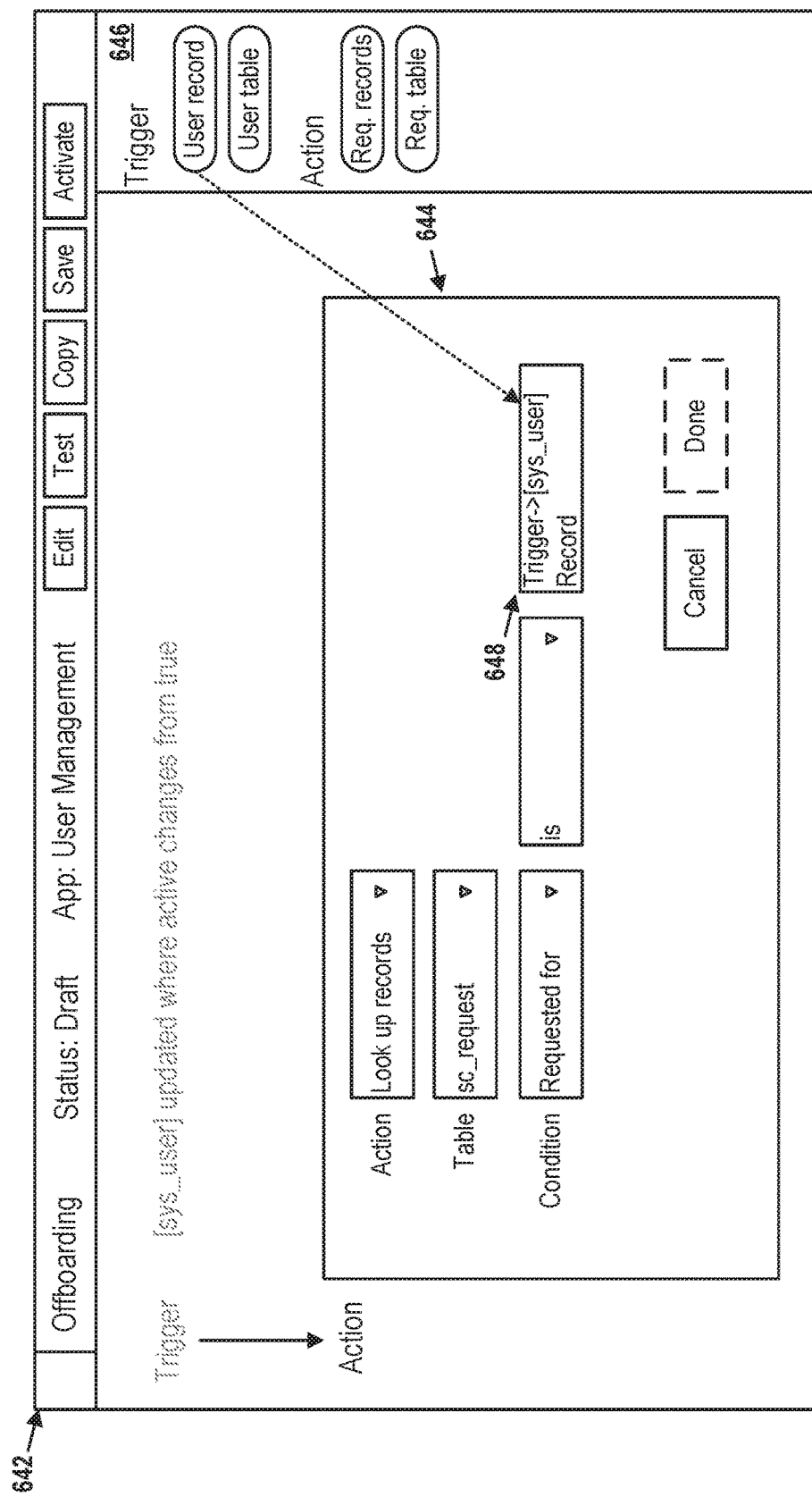

FIG. 6E depicts the second part of the action specification in GUI 642. Pop up window 644 (which, like window 606, may be a pane overlaid on top of GUI 642 and not a separate window), may allow specification of a table in which to look up records and the conditions that these records must meet. As shown in window 644, the action (as specified in FIG. 6D) is to look up records, and the table in which to perform this look up is sc_request (a table that contains catalog requests made by users). The records returned from sc_request are those where the "Requested for" field matches the user identified in the trigger step (i.e., a user whose active status has changed).

FIG. 6E also depicts column 646 containing pill-shaped user interface elements ("pills") arranged according to the previously-defined trigger as well as the action currently being defined. These pills are capable of being dragged from column 646 to the rightmost selectable item 648 in the condition field, as shown by the dotted arrow. User interface pills in this context are typically oval-shaped items that refer to data previously specified in the workflow and may be automatically placed in the user interface as this data is specified in the workflow design tool. In some embodiments, user interface chips or tags (with various shapes) may be used instead.

Notably, the two pills under the "Trigger" heading in column 646 refer to the user record(s) returned by the trigger (e.g., an entry in sys_user that changed from active to another state as specified in FIG. 6C) and the table upon which the trigger operates (e.g., sys_user as specified in FIG. 6C). The two pills under the "Action" heading in column 646 refer to the records found by the action being defined in FIG. 6E, as well as the table in which these records are located (e.g., sc_request).

The user interface elements, such as the pills in column 646, are a significant convenience for the user specifying the workflow, as they allow the user to easily include a reference to data or tables previously specified or referred to in the workflow. In this way, the user does not need to type in a specific reference to this information, and need only drag and drop a pill instead.

Once the user is satisfied with the information entered in window 644, the user may select or otherwise activate the "Done" button. This selection is denoted in FIG. 6E by this button being depicted with a dashed line. Once the user completes the dialog of window 644, the next phase of the workflow design tool, which allows the user to specify flow logic for the action, may be displayed.

Figure 6F:
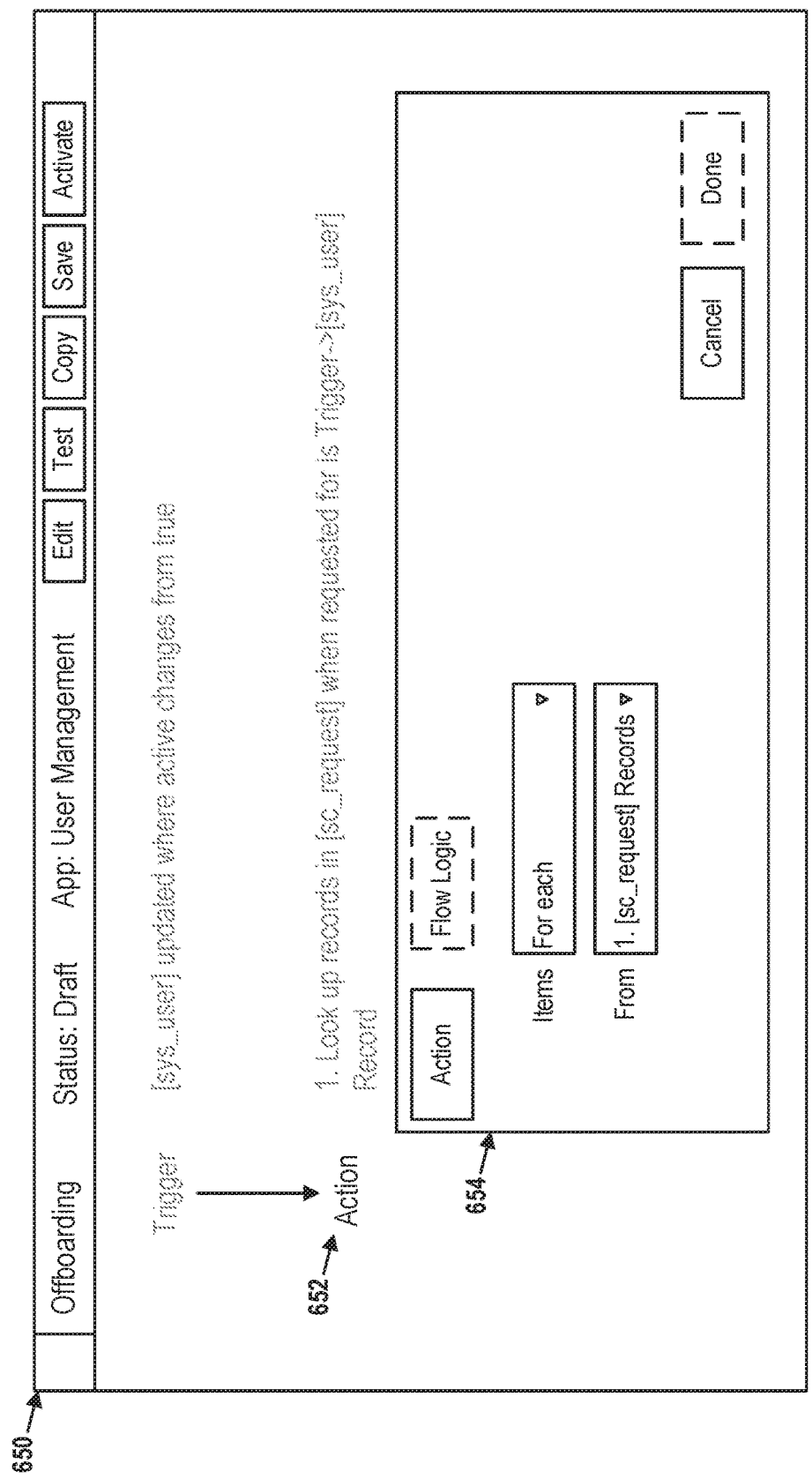

FIG. 6F depicts flow logic specification in GUI 650. Flow logic may be tied to an action, and specifies how the action is to be carried out. Notably, at 652 the word "Action" is annotated with a description of the action specified in FIGS. 6D and 6E.

Pop up window 654 may allow specification of whether the workflow operates on some or all items returned by the action specified in FIGS. 6D and 6E. The "Flow Logic" button is depicted with a dashed line to show that flow logic, rather than an action, is being specified. In this case, the selections made in window 654 indicate that the workflow operates on all items returned from the query specified in FIG. 6E. Notably, the "1. [sc_request] Records" value in the "From" field of window 654 indicates that the flow logic is to be applied to the output of Action 1, specified at 652. Notably, the value of the "From" field may be populated by a pill dragged and dropped from a column containing such pills. This column is not shown in FIG. 6F for purposes of simplicity, but may resemble column 646 of FIG. 6E.

Once the user is satisfied with the information entered in window 654, the user may select or otherwise activate the "Done" button. This selection is denoted in FIG. 6F by this button being depicted with a dashed line. Once the user completes the dialog of window 654, the next phase of the workflow design tool, which allows the user to specify a sub-action for the flow logic, may be displayed.

Figure 6G:
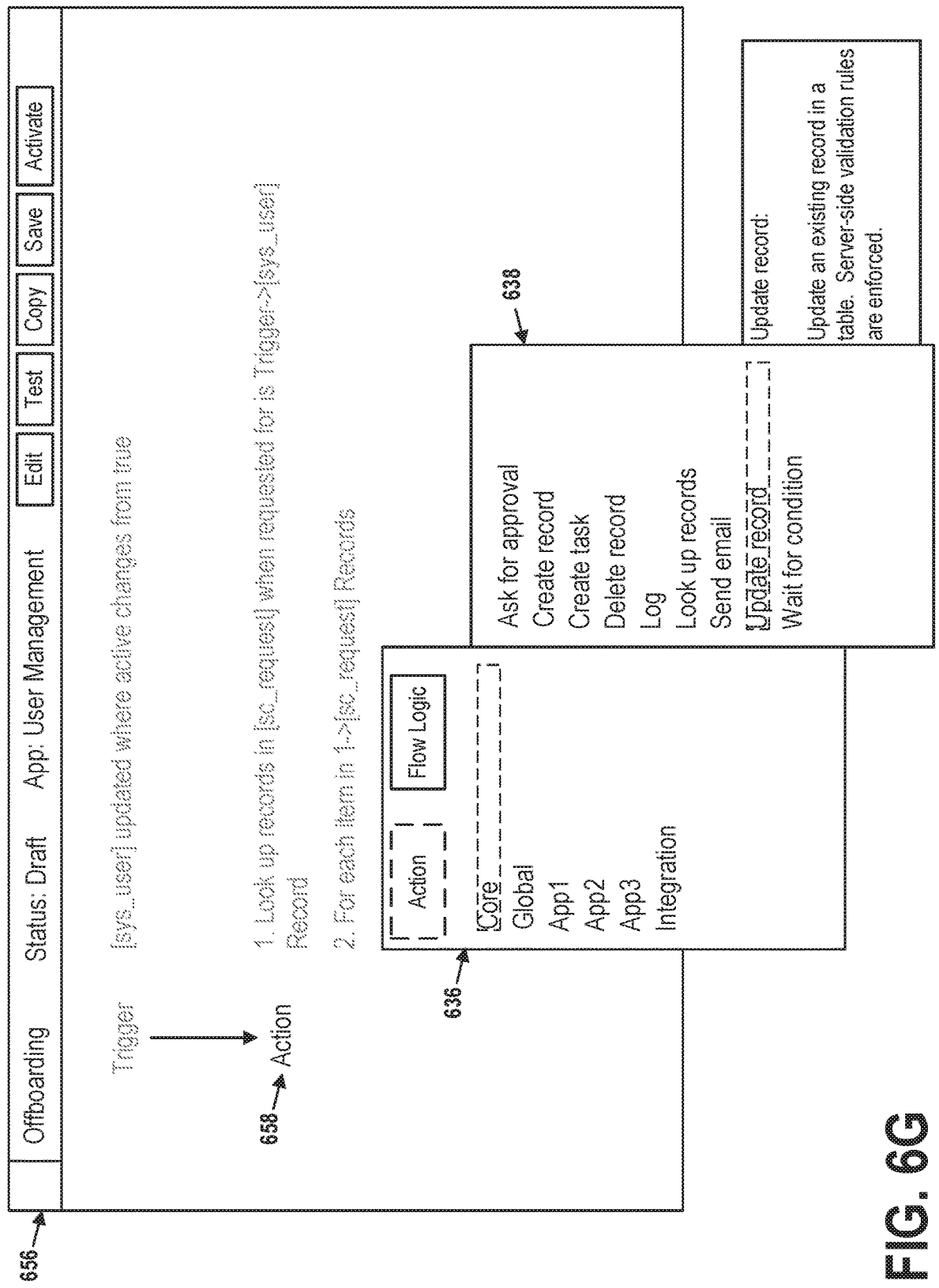

FIG. 6G depicts a sub-action specification in GUI 656. Notably, at 658, the word "Action" is accompanied by an updated description of the action and flow logic specified in FIGS. 6D, 6E, and 6F. Further, this text is grayed in order to indicate that the flow logic is no longer being specified. Notably, the sub-action specification once again displays menu 636 and sub-menu 638, this time with "Core" and "Update record" selected. Thus, GUI 656 depicts the user specifying that records will be updated for each item returned by the action defined in FIGS. 6D and 6E.

Figure 6H:
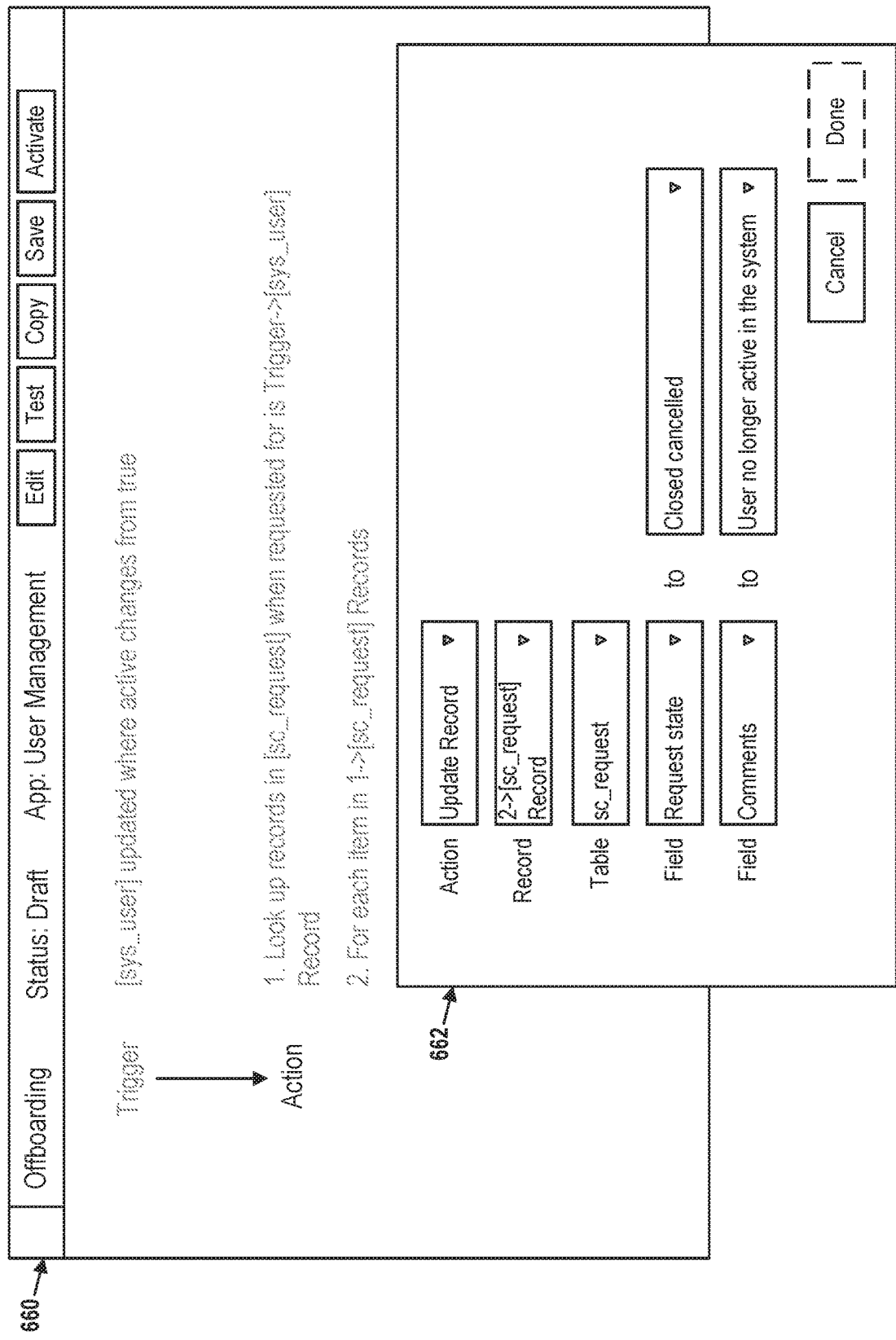

FIG. 6H continues this sub-action specification in GUI 660. Pop up window 662, may allow specification of actions to be taken on items returned by the flow logic specified in FIG. 6F. Particularly, the options shown in window 662 indicate that, for each record in the sys_user table that is returned by the trigger, any record in the sc_request table that was requested for the same user will be updated. The user also specifies two fields that are to be updated for matching records. The "Request state" field is to be updated to "Closed cancelled" to cancel the departed employee's pending catalog requests. The "Comments" field is also updated to "User no longer active in the system" to indicate why the request was cancelled.

Notably, the value of the "Record" field may be populated by a pill dragged and dropped from a column containing such pills. This column is not shown in FIG. 6H for purposes of simplicity, but may resemble column 646 of FIG. 6E.

Once the user is satisfied with the information entered in window 662, the user may select or otherwise activate the "Done" button. This selection is denoted in FIG. 6H by this button being depicted with a dashed line.

Figure 6I:
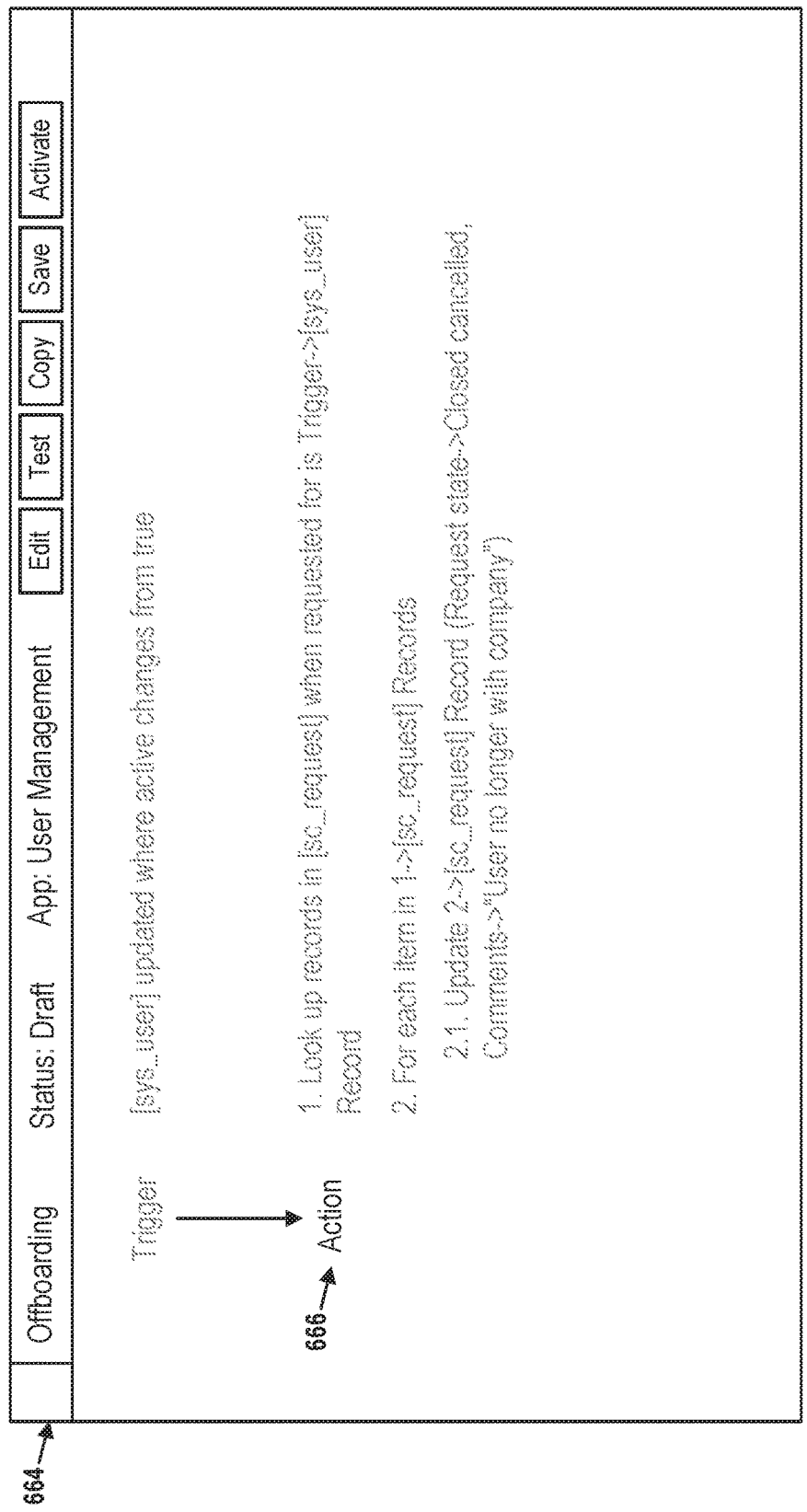

FIG. 6I shows GUI 664 depicting the workflow defined so far. At 666 the action specified in FIGS. 6D, 6E, 6F, 6G, and 6H is displayed. It is broken down into steps 1 (looking up records in the sc_request table that were requested for the employee identified by the trigger), 2 (for each these records, performing step/sub-action 2.1), and 2.1 (updating these records by closing them and adding an appropriate comment).

Figure 6J:
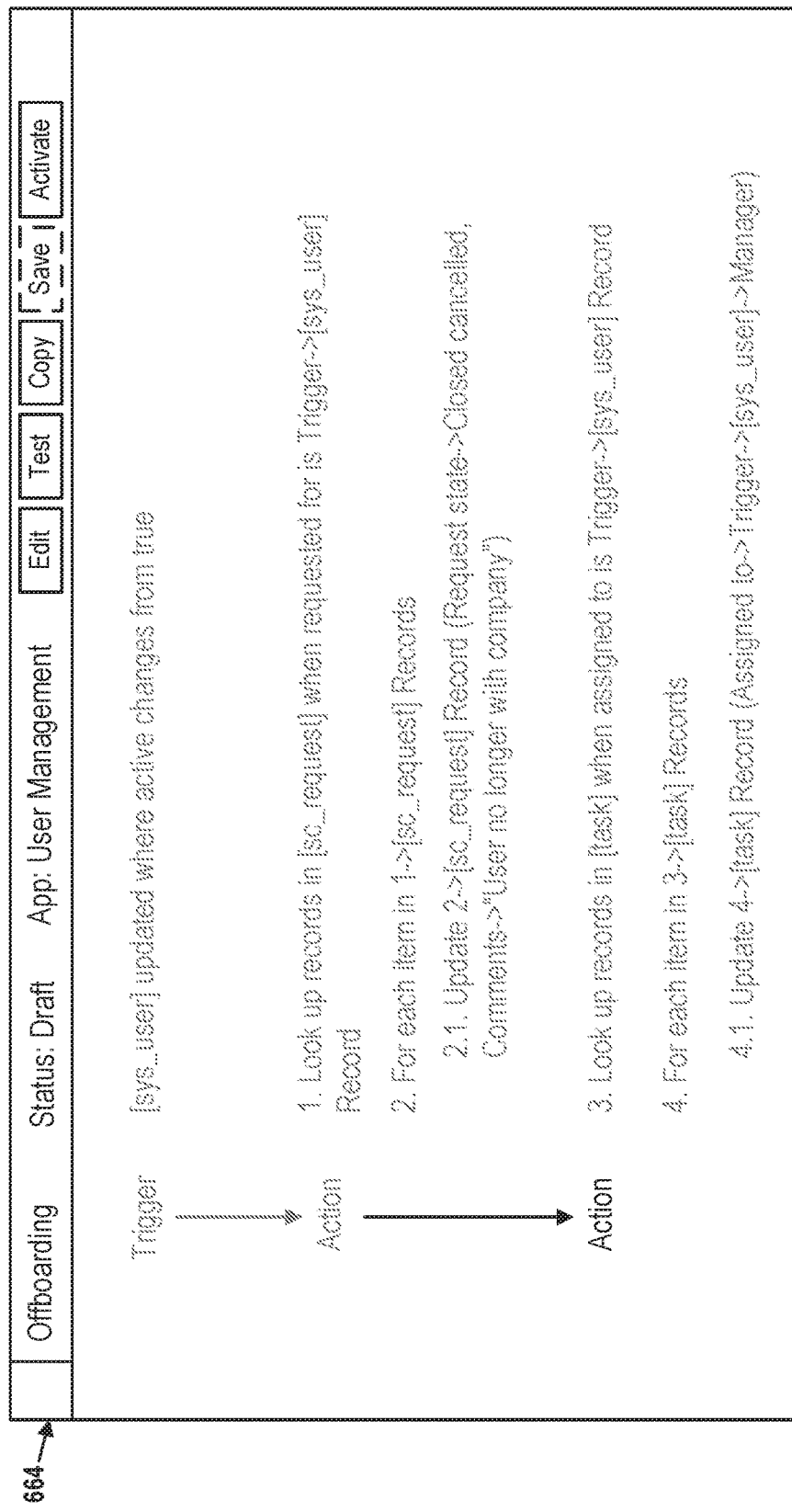

The rest of the desired workflow, as introduced above, also involves reassigning all tasks assigned to the departed employee to that person's manger. This further step is depicted in FIG. 6J. In order to avoid a degree of repetition, the GUIs for specifying the action, the flow logic, and the sub-action for task reassignment are omitted. Instead, FIG. 6J depicts GUI 664 updated to show the complete workflow.

Notably, step 3 looks up records in the task database table (which contains entries for tasks to be carried out by employees) that are assigned to the employee identified by the trigger. Step 4 specifies flow logic that, for each of these records, indicates that step/sub-action 4.1 is to be performed. Step 4.1 indicates that, for each record identified in step 4, the "Assigned to" field is to be changed to the manager of the identified employee.

In this way, arbitrarily complex flow-chart-like workflows can be rapidly designed in a data-centric fashion. The designer need not write any code, and is guided through the workflow specification by a series of GUIs that help the designer with appropriate menus and other interface elements. As a result, the designer saves a significant amount of time. In practice, experiments have shown that workflows can be specified in hours rather than the days typically needed for manually coding the workflows in a high-level programming language (e.g., JAVA®, JAVASCRIPT®, C++, and so on).

Another benefit of this workflow design tool is that it allows a workflow to be tested by the same GUI prior to deployment. FIG. 6K shows GUI 668, which contains the same information as GUI 660 from FIG. 6J, but also includes three columns reflecting the outcome of such a test. The "State" column indicates whether each step has been completed (in this example, all steps were completed), the "Start time" column indicates the time at which each step began, and the "Duration" column indicates how long each step took to be performed, in milliseconds. This allows the designer to verify that each step is properly performed, as well as to identify any steps that take an inordinate amount of time to complete. In alternative embodiments, other information may be displayed.

In the examples of FIGS. 6A-6K, a workflow is designed. The user persona that carries out such a process may be referred to as a workflow designer. However, actions may be designed in an analogous fashion (e.g., by way of similar GUIs) by a user with a persona of an action designer. Thus, an action designer may define custom actions that can be published, and published actions can be selected and incorporated into workflows by a workflow designer.

VI. Example Complex Data Objects and Xml Representations

Complex data objects are containers that represent compound data structures with elements of various types. As workflows may ingest data from REST or SOAP interfaces that is encoded as structured textual data (e.g., encoded in XML, JSON, or other formats), complex data objects can be integral to the operation of these workflows. In some cases, a complex data object may be used by an action, and the action may, in turn, be added to a workflow.

As an illustrative example, it is assumed that calls to a particular REST or SOAP interface provide data in an XML format. The properties of this format are explored below so that the integration of this structured textual data into a complex data object can be appreciated. Nonetheless, other markup languages or structured data formats (e.g., JSON) could be used instead of XML.

FIG. 7A provides an example mapping between XML data 700 and its XPaths 702. As noted above, XML data 700 may be returned by a call to a REST or SOAP interface. In this example, the interface provides information on users, include each user's name, telephone numbers, and address.

XML data 700 is organized as a series of tags, each tag encapsulating data and/or other tags and data. A tag may represent a field within XML data 700. For instance, the <users> tag encapsulates the <user> tag, and the <user> tag encapsulates the <name1>, <name2>, <telephones>, and <address> tags. Each tag and the data it encapsulates may be represented as a text string. This allows a semantic meaning to be associated with each tag. As shown in FIG. 7A, each tag describes its encapsulated data. For instance, the <city> tag encapsulates the text string "Chicago".

XML data 700 can be arbitrarily large and complex, with numerous entries and levels of nested tags. Thus, the example shown is limited in scope for purposes of illustration only. For instance, multiple <user> tags may be encapsulated by the <users> tag, and each of these <user> tags may further encapsulate respective <name1>, <name2>, <telephones>, and <address> tags.

By concatenating the tags that encapsulate any particular unit of data, a tag path, otherwise known as an XPath, can be formed. For example, the XPath for the <name2> tag is "/users/user/name2". XPaths provide a way to uniquely refer to and/or address specific units of data within XML data 700. XPaths 702 depict the XPaths that correspond to each tag in XML, data 700.

Figure 7B:
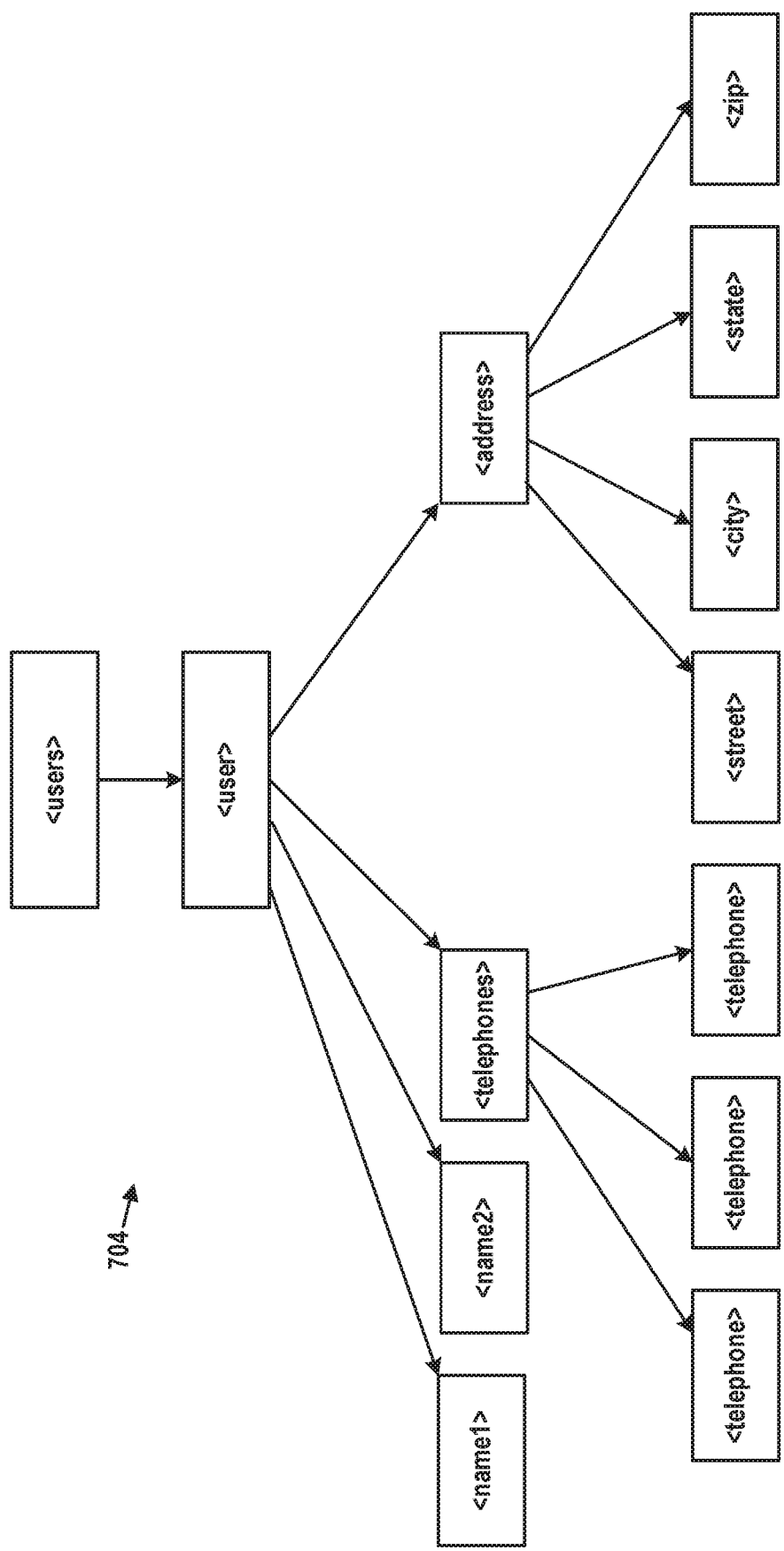
FIG. 7B depicts a tree representation of XML data, in accordance with example embodiments.

FIG. 7B depicts another way of representing XML data 700. In tree 704, each tag is represented as a node in a hierarchy corresponding to its position in XML data 700. Thus, the <users> tag is the root node and its child is the <user> tag. The <user> tag, in turn, has the <name1>, <name2>, <telephones>, and <address> tags as its children. Tree 704 is a convenient way of representing the tag structure within XML data 700. In particular, tree 704 can be recursively generated from XML data 700 and recursively traversed as well.

VII. Example Guis For Defining A Complex Data Object

Figure 8A:
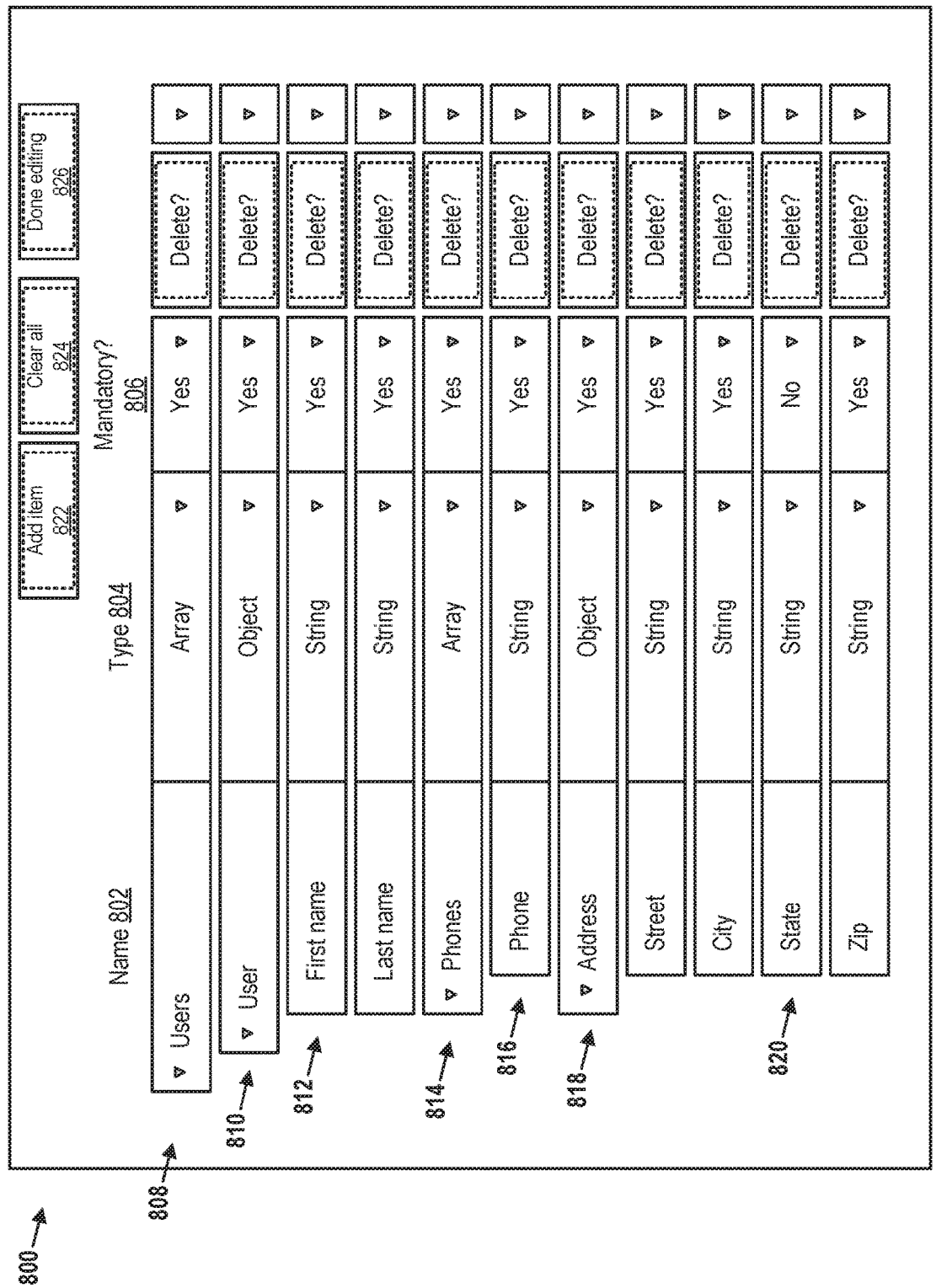
FIGS. 8A, 8B, 8C, and 8D depict complex data object manipulation graphical user interfaces, in accordance with example embodiments.

FIG. 8A depicts a GUI 800 through which a user can define and edit a complex data object. As noted above, a complex data object is a compound data structure that can be incorporated into an action of a workflow. In FIG. 8A, the displayed complex data object corresponds to the schema of XML data 700.

Particularly, GUI 800 contains a set of columns for specifying and editing the elements of the complex data object. Name column 802 indicates the name of each element, type column 804 indicates the element's type, and mandatory column 806 indicates whether the presence of the element is required. Notably, only one element in FIG. 8A, state element 820, is not mandatory.

In the embodiment shown, three types are supported: object, array, and string. Elements of the type object are essentially complex data objects themselves—compound data structures of one or more elements. Thus, user element 810 is an object that contains two strings as its elements, while address element 818 is an object that contains three or four strings as its elements (depending on whether state element 820 is present).

Elements of the type array contain one or more elements of the same type therein. Thus, users element 808 and phones element 814 are arrays. The former contains one or more of user element 810, while the latter contains one or more of phone element 816. Users element 808 may be considered to be a "root" element of which all other elements are children. Therefore, the type of users element 808 may be a container, such as an object or an array (e.g., an array of objects or array of strings).

The remaining elements are strings. For example, first name element 812, phone element 816, and state element 820 are expressed and stored as text strings.

The use of objects and arrays allows the complex data object to be recursively defined. Thus, objects can contain arrays and strings, while arrays can contain objects or strings. The entire complex data object itself may be thought of as an object. The nesting of objects and arrays may be arbitrarily deep. Further, the elements of the object may be dot-walked for convenience. Dot-walking refers to an element by building a chain of element names separated by dots (periods). For instance, users.user.address.street references the street name in an address of a user in the array of users. Dot-walking can be used in forms, lists, scripts, for example.

In some embodiments, other data types may be used, such as integers, floating point numbers, text characters, and so on.

As noted above, type column 804 shows the type of each element. Selecting or otherwise activating the drop-down arrow at the right of each entry in type column 804 may cause a drop-down menu to appear. This menu may list each element type so that the types of elements can be modified. Similarly, selecting or otherwise activating the drop-down arrow at the right of each entry in mandatory column 806 may cause another drop-down menu to appear, this one allowing the options "yes" and "no" to be chosen.

As shown in FIG. 8A, each element may also be associated with a "delete" button that, when selected or otherwise activated, causes the element to be removed from the complex data object. Also, a further drop-down arrow at the far right of each element allows other associations to be made with the element, as will be discussed below.

Add item button 822, when selected or otherwise activated, causes a new element to be added to the complex data object. Once added, it can be positioned within the element by sliding it up or down, its type can be defined, and whether it is mandatory can also be defined. Alternatively or additionally, other user interface controls could be used to add items to the complex data object, such as plus buttons between or associated with elements.

Clear all button 824, when selected or otherwise activated, causes all elements of the complex data object to be deleted. Done editing button 826, when selected or otherwise activated, causes GUI 800 to leave complex data object editing mode, so that the complex data object as defined can be added to actions and/or workflows.

Advantageously, GUI 800 allows a user to visually define a complex data object, rather than specify it in a file or code it in a parser. As a consequence, both technical and non-technical users can more easily define actions and workflows that use complex data objects.

Figure 8B:
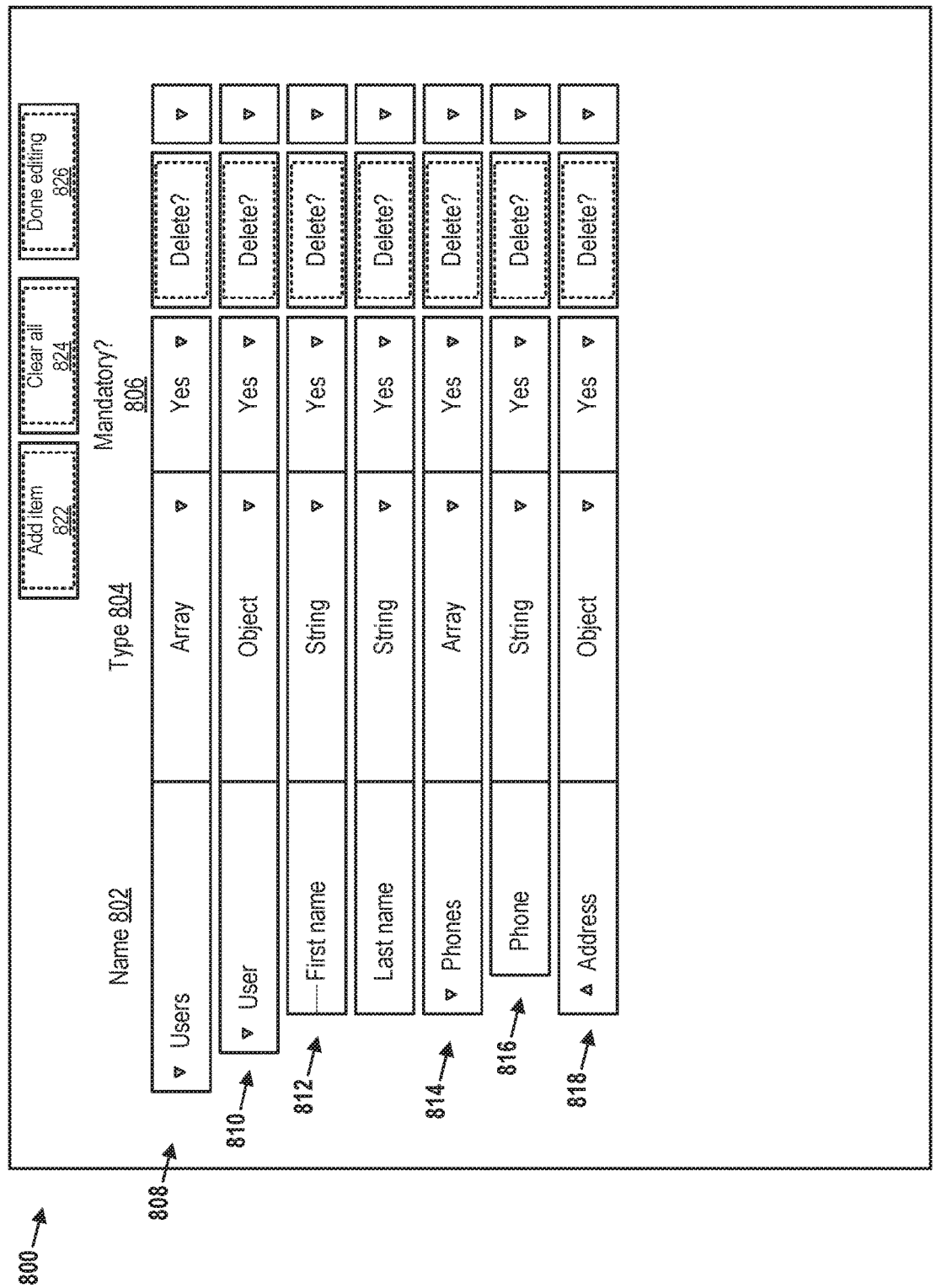

Notably, the array elements and object elements depicted in GUI 800 can be collapsed by selecting or otherwise activating the drop-down arrow to the left of its entry in name column 802. This is shown in FIG. 8B, where the drop-down array of address element 818 has been selected or otherwise activated. Accordingly, the elements within the associated object are collapsed into address element 818.

As noted previously, there may be a mapping between a complex data object and XML data defined according to a particular schema. In these embodiments, XML data (such as XML data 700) may be received by way of a REST or SOAP call. In order to ensure that the fields of the XML data are mapped to the appropriate complex data object elements, the XPath of each XML field of interest may be associated with a complex data object element. In this way, the mapping is clear, and XML fields that are not of interest can be ignored and/or excluded from the complex data object.

Figure 8C:
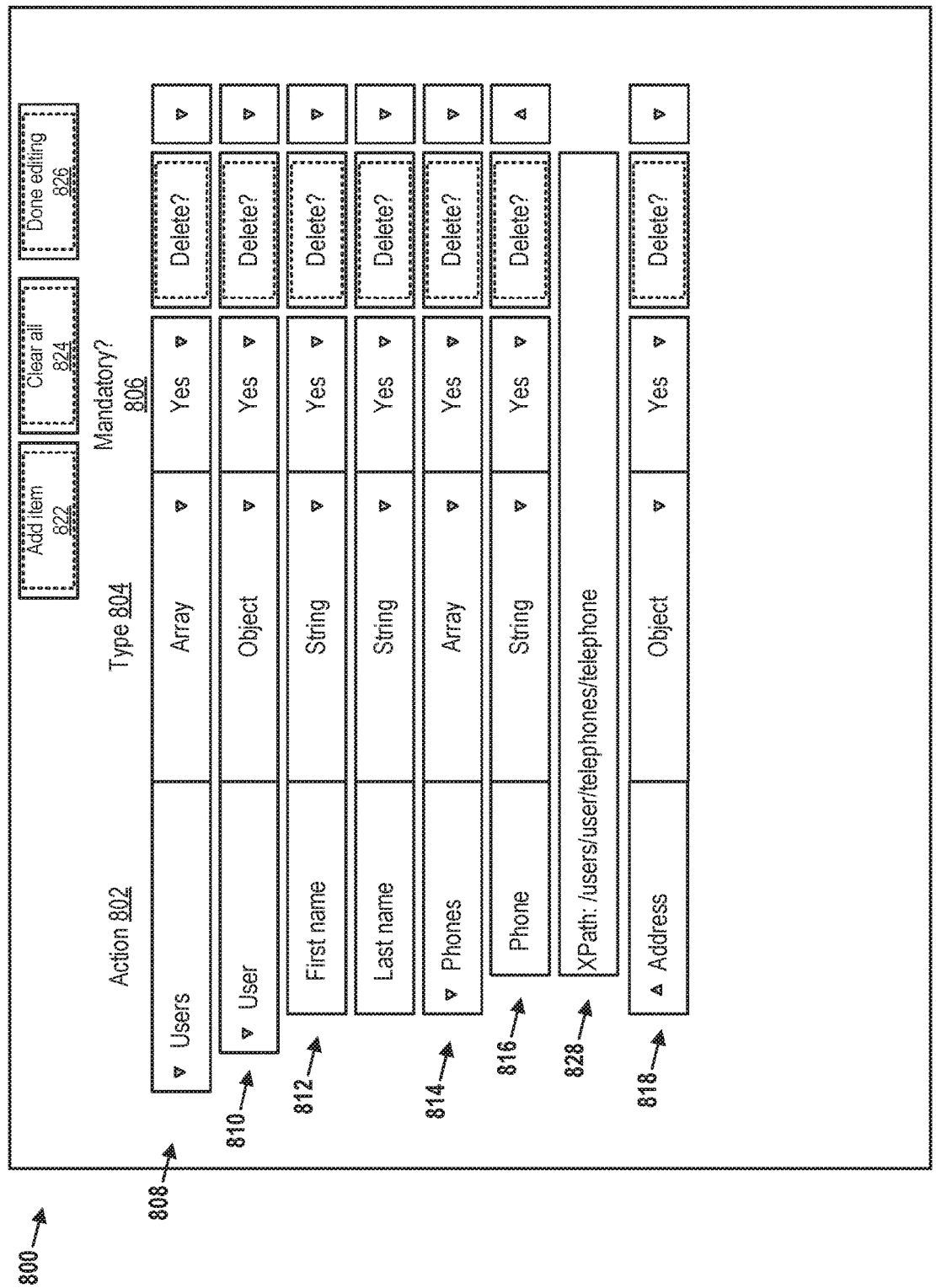

FIG. 8C depicts GUI 800 with the drop-down arrow in the far right column of phone element 816 selected. This may cause XPath specification text box 828 to appear. In this text box, a user may enter the XPath of an XML field to which phone element 816 corresponds. Then, when the associated XML field is found in received XML data, it is mapped to and stored in the appropriate element of the complex data object. In the example of FIG. 8C, the /users/user/telephones/telephone XPath from XML data 700 (and shown in XPaths 702) is mapped to phone element 816. Similar XPaths can be defined for other mappings between XML fields and complex data object elements.

Figure 8D:
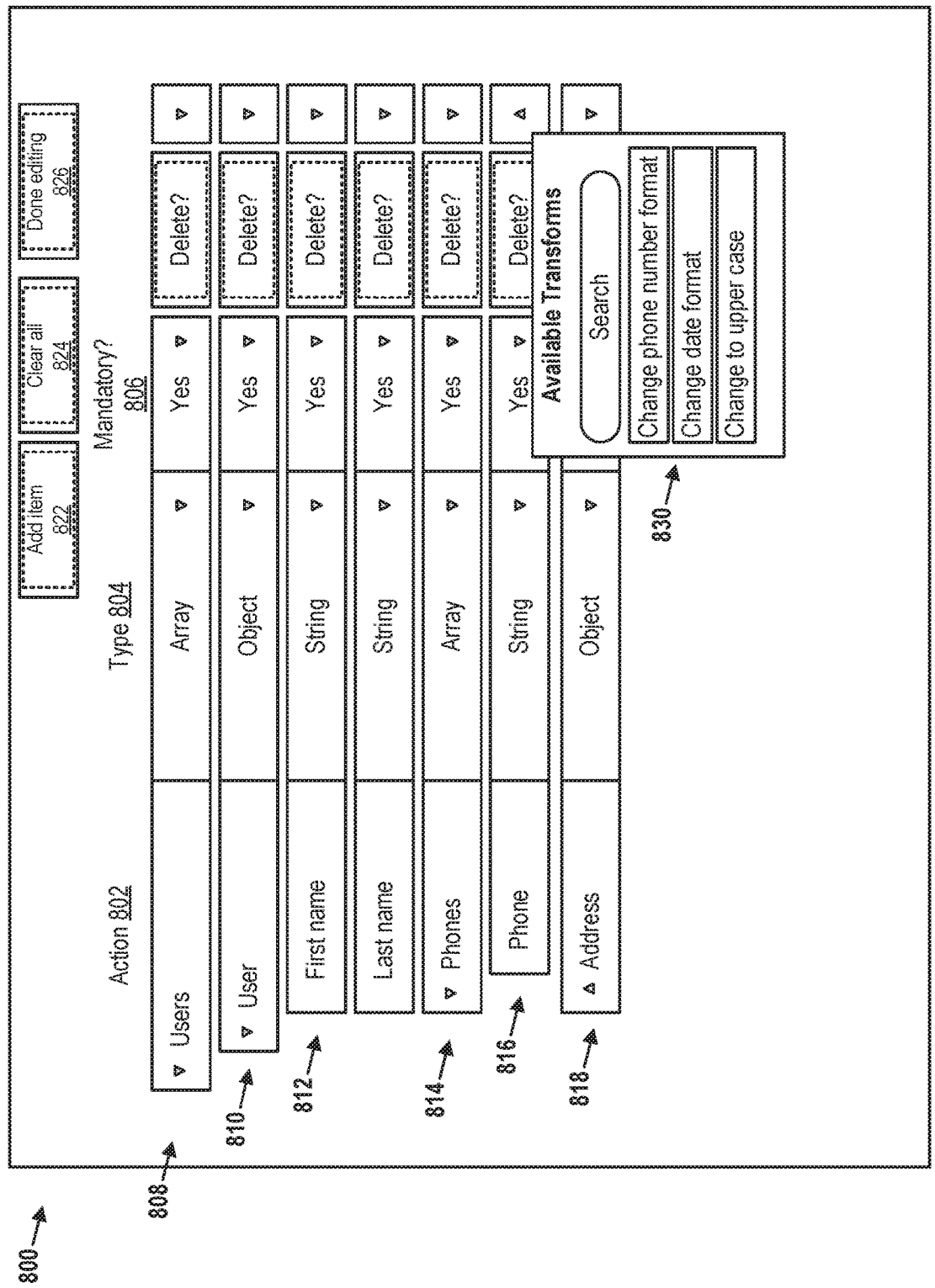

FIG. 8D depicts another possible operation of the drop-down arrow in the far right column (in practice these operations may have different selectors on GUI 800). In particular, this selection or activation of the drop-down arrow in the far right column of phone element 816 causes pop-up window 830 to appear.

In this window, a user can choose between several data transformation options. As a few possibilities, pop-up window 830 shows options for changing phone number format, changing data format, and changing the text of the element to upper case.

For example, if the user selects the "Change phone number format" option, another pop-up window may allow the user to select pre-defined or user-defined transformations from the U.S. 10-digit format XXX-XXX-XXXX to XXXXXXXXXX or vice versa. Other transformations of phone number formats are possible. Thus, for instance, if the XML data contains phone numbers in the XXX-XXX-XXXX format and it is desirable to store these phone numbers in the complex data object using the XXXXXXXXXX format, selecting the appropriate transformation can accomplish this goal.

Similar transformations can be between date formats (e.g., from YYYY-MM-DD format to MM-DD-YYYY format), and so on. Notably, the search text box in pop-up window 830 suggests that many such transformations may be available.

The embodiments of FIGS. 8A-8D are depicted for purposes of example and various modifications to the information displayed and arrangements thereof can be made. Thus, the embodiments shown and discussed are merely for purpose of illustration, and other embodiments and variations may fall within the scope of the disclosure herein.

VIII. Example Guis for Automatically Generating a Complex Data Object

Figure 9A:
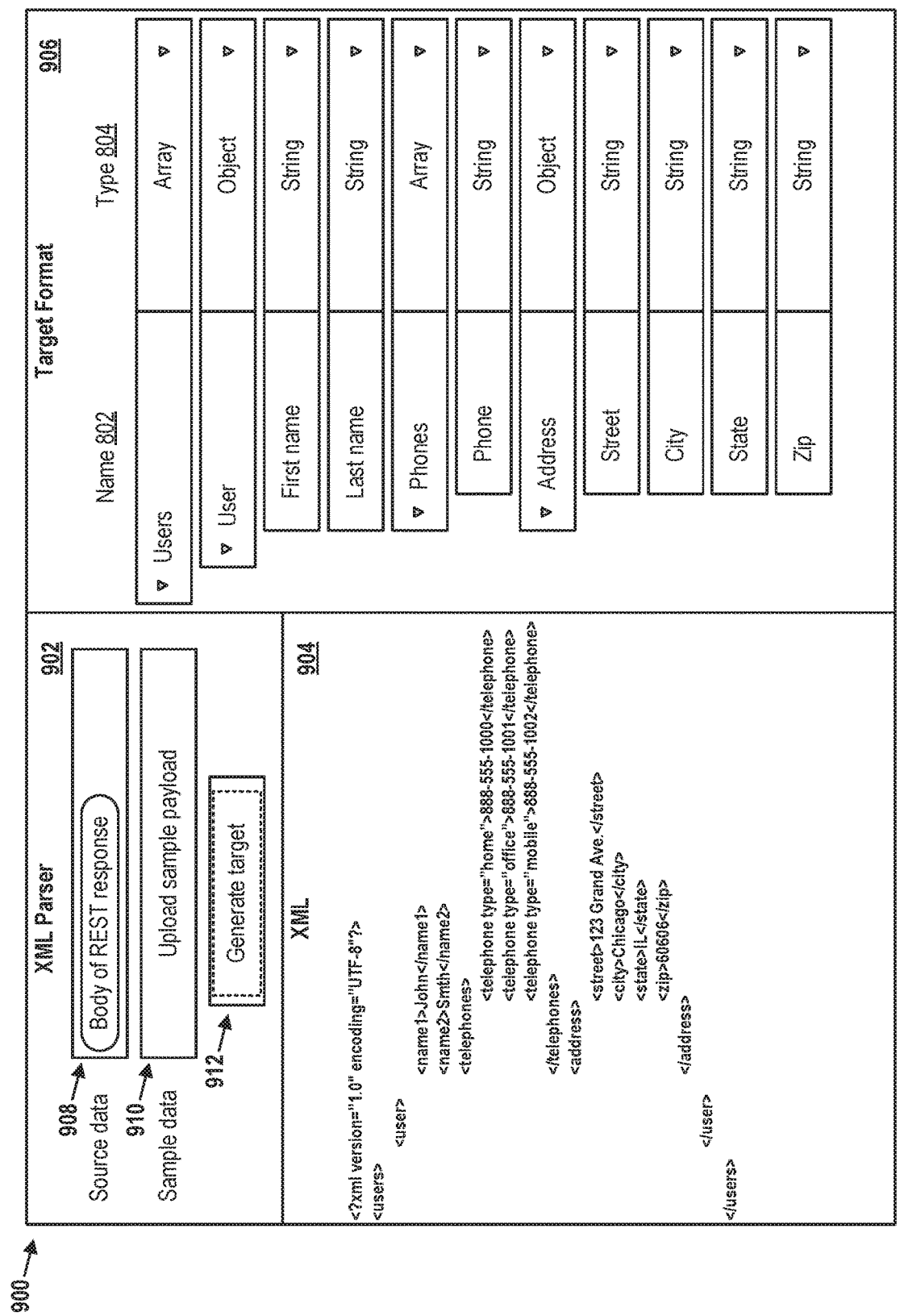
FIGS. 9A and 9B depict graphical user interfaces that facilitate generating a complex data object from structured textual data, in accordance with example embodiments.

FIG. 9A depicts a GUI 900 through which a user can automatically generate a complex data object. Once this complex data object is generated, it can be edited as discussed above in the context of FIGS. 8A-8D.

GUI 900 contains three main panels: XML parser specification panel 902, XML sample payload panel 904, and target format panel 906. In various embodiments other panels and/or other arrangements of panels may appear on GUI 900.

XML parser specification panel 902 contains a source indicator 908 of the XML data to map to a complex data object. Here, the source of the XML data is a body (e.g., HTTP body) of a response to a REST call. As indicated in the visual depiction of source indicator 908, this may be selected by way of a pill user interface widget that can be dragged and dropped from a catalog thereof. Thus, this pill may have been defined earlier in the specification of this action.

Sample data indicator 910 may be a button that the user can select or otherwise activate to upload a sample XML, payload. For instance, selection or activation of this button may cause a file system browsing widget to appear on GUI 900, and this widget may allow the user to select an XML file. Any such uploaded payload may appear in XML sample payload panel 904.

Generate target button 912 may serve to automatically generate a complex data object from the sample XML payload in XML sample payload panel 904. The complex data object may appear in target format panel 906.

As shown, XML sample payload panel 904 contains XML data 700 from FIG. 7A. XML data 700 may have been loaded into XML sample payload panel 904 by way of sample data indicator 910 or by the user copying and pasting XML data 700 from another source.

Target format panel 906 is an abbreviated representation of the complex data object that can be generated from the XML data of XML sample payload panel 904. This complex data object is the same as the one discussed in the context of FIGS. 8A-8D, but for purposes of illustration only the name column 802 and type column 804 are shown. In various embodiments, target format panel 906 may contain some or all of the features of GUI 800, including the ability for the user to edit the displayed complex data object.

In some embodiments, the names of the elements in name column 802 may match the associated field from the XML data. This is not shown in FIG. 9A in order to emphasize that the field names (e.g., the tags in the XML data) may be different from the element names of the complex data object, and that mappings therebetween can be made by way of XPath associations.

Automatically parsing XML data to generate a complex data object may involve mapping XML fields to objects, arrays, and strings. As one possible way of doing so, the parser may initially determine that an XML field whose immediate children are all defined using the same type of tag is an array. Examples of arrays, therefore, are the <users> tag and the <telephones> tag. The parser may also determine that an XML field whose immediate children are defined using different types of tags is an object. Examples of objects, therefore, are the <user> tag and the <address> tag. The remaining XML fields may be assumed to be strings.

Thus, by way of GUI 900, a user may be able to (i) upload or copy and paste XML data into XML sample payload panel 904, (ii) select or activate generate target button 912, and (iii) as a result, the complex data object shown in target format panel 906 is generated and displayed. The user may be able to further edit this complex data object as needed.

In particular, the user may be able to edit the XPath of one or more of the elements of the complex data object as shown in FIG. 8C or in some other fashion. For example, a text box similar to XPath specification text box 828 may be displayable for any of the elements so that the user can preview or edit the elements' XPaths.

Figure 9B:
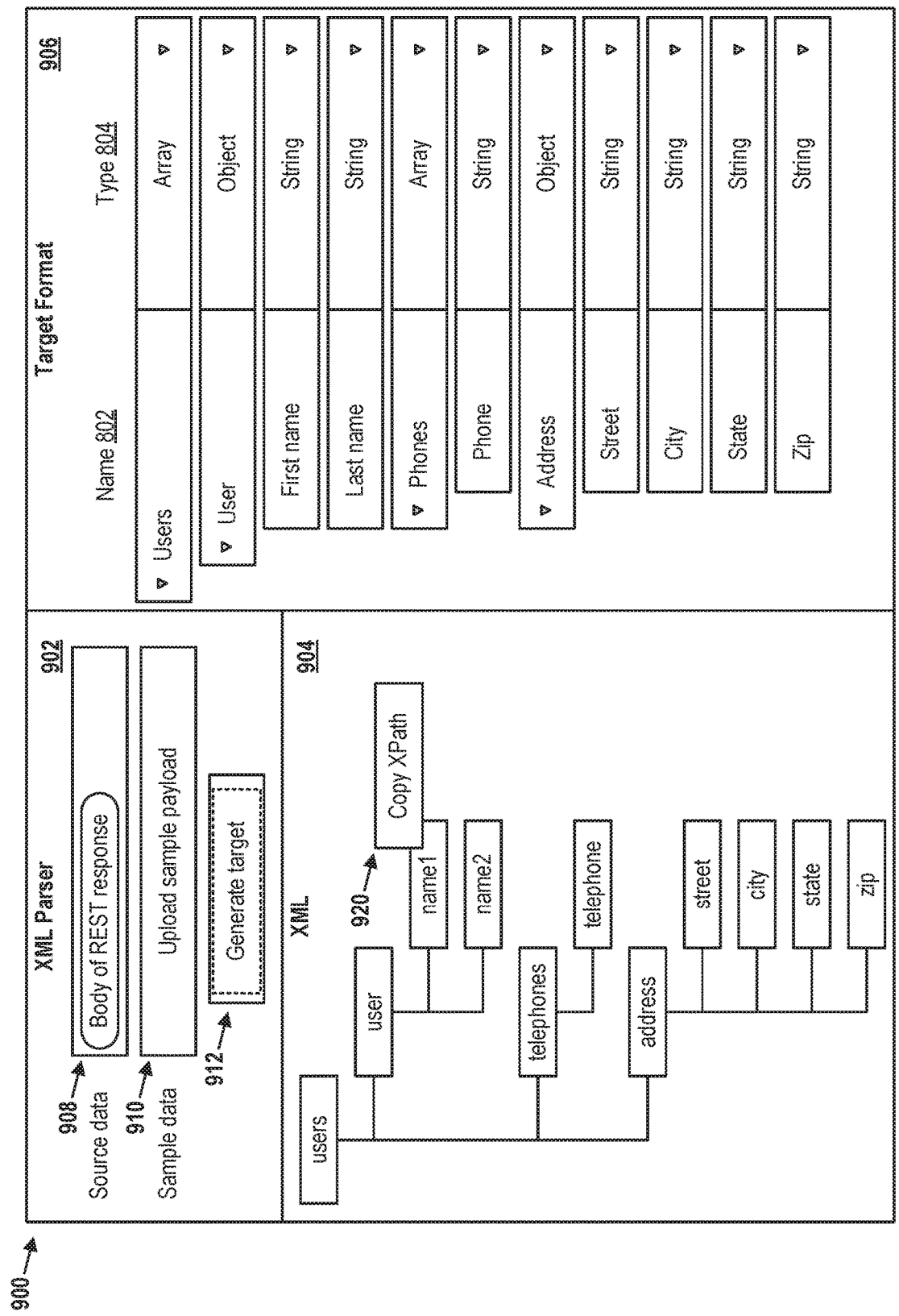

FIG. 9B is identical to FIG. 9A, except that XML sample payload panel 904 is depicted in a tree-like structure (not unlike tree 704). GUI 900 may allow the user to switch between the raw XML view shown in FIG. 9A and the tree view shown in FIG. 9B with a toggle user interface element (not shown).

Advantageously, each node of the XML tree, when selected, may display an option to copy the XPath associated with that node. This is depicted as pop-up button 920. Once such an option is selected (e.g., pop-up button 920 is selected or otherwise activated), the node's) (Path is copied to a buffer. For instance, selecting or otherwise activating pop-up button 920 may copy the text string "/users/user/name1" to the buffer. Then the contexts of the buffer can be pasted into an XPath specification text box for the associated complex data object element in target format panel 906. This pasting operation may occur as shown in FIG. 8C or in some other fashion.

Once the user is satisfied with the definition of the complex data object and its mapping to XML fields, the user can publish the associated action. This may result in automatic creation of an XML parser configured to receive XML data and populate a data structure representing the complex data object in accordance with the defined mappings. The action containing this parser can be integrated into a workflow defined in accordance with FIGS. 6A-6K, for example.

IX. Example Operations

FIG. 10 is a flow chart illustrating an example embodiment. The process illustrated by FIG. 10 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 10 may be simplified by the removal of any one or more of the features shown therein. Further, these embodiments may be combined with features, aspects, and/or implementations of any of the previous figures or otherwise described herein.

Block 1000 may involve transmitting, to a client device, a depiction of a graphical user interface, where the depiction of the graphical user interface includes a visual representation of a recursively-defined complex data object, where elements of the recursively-defined complex data object each have associated names and associated types, where the associated types are either a string, an array of identical elements, or an object of two or more elements, where the recursively-defined complex data object as well as each array and object therein is represented as a collapsible menu item that can either display or hide its elements, and where each displayed element shows its associated description and associated type.

Block 1002 may involve receiving, from the client device and by way of the graphical user interface, a modification to an element of the recursively-defined complex data object, where the modification is either removal of the element, addition of the element, or a change to the associated type of the element (here, for sake of convenience, an element added to a complex data object is considered to be a modification of that element).

Block 1004 may involve updating persistent storage to represent the recursively-defined complex data object as modified.

Block 1004 may involve transmitting, to the client device, an update to the visual representation that reflects the recursively-defined complex data object as modified.

Some embodiments may further involve: receiving structured textual data as part of a workflow carried out by the computational instance, mapping fields of the structured textual data to the elements of the recursively-defined complex data object, and storing, in the persistent storage and as an instantiation of the recursively-defined complex data object, the fields as mapped.

In these embodiments, the graphical user interface may include indications of whether each element in the recursively-defined complex data object is mandatory or optional, where the modification can also be to change whether the element is indicated to be mandatory or optional, and where elements indicated to be mandatory must be mapped from the fields of the structured textual data.

In these embodiments, the graphical user interface includes a path definition option for the element that, when selected, allows specification of a path within the structured textual data that specifies a field therein, and where mapping fields of the structured textual data to the elements comprises mapping the field to the element due to the specification of the path.

In these embodiments, the associated type of the element may be a string, where the graphical user interface includes a transform selector option for the element that, when selected, allows specification of a string format for the element, and where mapping a field of the structured textual data to the element comprises transforming text of the field to the string format.

In some embodiments, the graphical user interface also includes an option for specifying example structured textual data, where the example structured textual data can be used to generate the elements of the recursively-defined complex data object and an arrangement thereof.

In these embodiments, the option for specifying example structured textual data may be a widget that facilitates uploading of a file containing the example structured textual data.

In these embodiments, the option for specifying example structured textual data is a text box for entering the example structured textual data.

In these embodiments, the example structured textual data is displayed either textually or in a tree format depicting nodes, where each of the nodes is associated with a unique field of the example structured textual data, and where each of the nodes is selectable to obtain a path within the example structured textual data that specifies the associated field. The graphical user interface may also include an option to, based on the example structured textual data, generate the elements of the recursively-defined complex data object and the arrangement thereof.

X. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system, comprising:
 a computational instance of a remote network management platform, the computational instance running in an environment having hardware resources comprising:
  persistent storage;
  one or more processors; and
  a memory, wherein the memory includes instructions, that when executed by the one or more processors, cause the one or more processors to:
  receive, from a client device and by way of a graphical user interface (GUI), an indication of a source of XML data, wherein the client device is associated with a managed network and the computational instance is dedicated to the managed network;
  automatically generate a recursively-defined complex data object based on the source of the XML data, wherein each element of the recursively-defined complex data object has one or more associated names and one or more associated types mapped to respective fields of the source of the XML data, and wherein the one or more associated types comprise a string, an array of identical elements, or an object of two or more elements;
  store the recursively-defined complex data object in the persistent storage;
  transmit, to the client device, an updated GUI, wherein the updated GUI includes a visual representation of the recursively-defined complex data object, wherein the recursively-defined complex data object as well as each array and object therein is represented as a collapsible menu item that can either display or hide its elements, and wherein each displayed element shows its associated description and associated type;
  receive, from the client device and by way of the updated GUI, a modification to an element of the recursively-defined complex data object, wherein the modification comprises defining a tag path configured to update one or more of the respective fields of the XML, data mapped to the element;
  update the persistent storage to represent the recursively-defined complex data object as modified; and
  transmit, to the client device, an update to the visual representation that reflects the recursively-defined complex data object as modified.

2. The system of claim 1, wherein the instructions cause the one or more processors to:
 store, in the persistent storage and as an instantiation of the recursively-defined complex data object, the respective fields as mapped.

3. The system of claim 1, wherein the updated GUI includes indications of whether each element in the recursively-defined complex data object is mandatory or optional, wherein the modification comprises changing whether the element is indicated to be mandatory or optional, and wherein elements indicated to be mandatory must be mapped from the respective fields of the source of the XML data.

4. The system of claim 1, wherein the one or more associated types of the element comprises a string, wherein the updated GUI includes a transform selector option for the element that, when selected, allows specification of a string format for the element, and wherein text of the respective fields of the source of the XML data are transformed to the string format when mapped to the elements of the recursively-defined complex data object.

5. The system of claim 1, wherein receiving the indication of the source of the XML data comprises receiving, via a widget of the graphical user interface, an uploaded file that contains the source of the XML data.

6. The system of claim 1, wherein receiving the indication of the source of the XML data comprises receiving, via a text box of the graphical user interface, the XML data.

7. The system of claim 1, wherein the GUI is configured to display the XML data in a tree format depicting nodes after the indication of the source of the XML data is received, wherein each of the nodes is associated with a unique field of the XML data, and wherein each of the nodes is selectable to obtain a path within the XML data that specifies the unique field.

8. The system of claim 1, wherein:
 receiving the indication of the source of the XML data comprises receiving the indication of the source of the XML data from a first panel of the GUI;
 a second panel of the GUI is configured to display the visual representation of the recursively-defined complex data object; and
 the first panel of the GUI and the second panel of the GUI are displayed simultaneously.

9. A computer-implemented method comprising:
- receiving, by a server device and from a client device and by way of a graphical user interface (GUI), an indication of a source of XML data, wherein the client device is associated with a managed network;
- automatically generating, by the server device, a recursively-defined complex data object based on the source of the XML, data, wherein each element of the recursively-defined complex data object has one or more associated names and one or more associated types mapped to respective fields of the source of the XML data, and wherein the one or more associated types comprise a string, an array of identical elements, or an object of two or more elements;
- storing, by the server device, the recursively-defined complex data object in a persistent storage;
- transmitting, by the server device and to the client device, an updated GUI, wherein the updated GUI includes a visual representation of the recursively-defined complex data object, wherein the recursively-defined complex data object as well as each array and object therein is represented as a collapsible menu item that can either display or hide its elements, and wherein each displayed element shows its associated description and associated type;
- receiving, by the server device and by way of the updated GUI, a modification to an element of the recursively-defined complex data object, wherein the modification comprises defining a tag path configured to update one or more of the respective fields of the XML, data mapped to the element;
- updating, by the server device, the persistent storage to represent the recursively-defined complex data object as modified; and
- transmitting, by the server device and to the client device, an update to the visual representation that reflects the recursively-defined complex data object as modified.

10. The computer-implemented method of claim 9, comprising:
- storing, in the persistent storage and as an instantiation of the recursively-defined complex data object, the respective fields as mapped.

11. The computer-implemented method of claim 9, wherein the GUI is configured to display the XML, data in a tree format depicting nodes after the indication of the source of the XML data is received, wherein each of the nodes is associated with a unique field of the XML, data, and wherein each of the nodes is selectable to obtain a path within the XML data that specifies the unique field.

12. The computer-implemented method of claim 9, wherein:
- receiving the indication of the source of the XML data comprises receiving the indication of the source of the XML, data from a first panel of the GUI;
- a second panel of the GUI is configured to display the visual representation of the recursively-defined complex data object; and
- the first panel of the GUI and the second panel of the GUI are displayed simultaneously.

13. An article of manufacture including a non-transitory computer-readable medium, having stored thereon program instructions that, upon execution by a computing system, cause the computing system to perform operations comprising:
- receiving, from a client device and by way of a graphical user interface (GUI), an indication of a source of XML data, wherein the client device is associated with a managed network;
- automatically generating a recursively-defined complex data object based on the source of the XML data, wherein each element of the recursively-defined complex data object has one or more associated names and one or more associated types mapped to respective fields of the source of the XML data, and wherein the one or more associated types comprise a string, an array of identical elements, or an object of two or more elements;
- storing the recursively-defined complex data object in a persistent storage;
- transmitting, to the client device, an updated GUI, wherein the updated GUI includes a visual representation of the recursively-defined complex data object, wherein the recursively-defined complex data object as well as each array and object therein is represented as a collapsible menu item that can either display or hide its elements, and wherein each displayed element shows its associated description and associated type;
- receiving, from the client device and by way of the updated GUI, a modification to an element of the recursively-defined complex data object, wherein the modification comprises defining a tag path configured to update one or more of the respective fields of the XML data mapped to the element;
- updating the persistent storage to represent the recursively-defined complex data object as modified; and
- transmitting, to the client device, an update to the visual representation that reflects the recursively-defined complex data object as modified.

14. The article of manufacture of claim 13, wherein the operations comprise:
- storing, in the persistent storage and as an instantiation of the recursively-defined complex data object, the respective fields as mapped.

15. The article of manufacture of claim 13, wherein the GUI is configured to display the XML, data in a tree format depicting nodes after the indication of the source of the XML data is received, wherein each of the nodes is associated with a unique field of the XML data, and wherein each of the nodes is selectable to obtain a path within the XML data that specifies the unique field.

16. The article of manufacture of claim 13, wherein:
- receiving the indication of the source of the XML data comprises receiving the indication of the source of the XML data from a first panel of the GUI;
- a second panel of the GUI is configured to display the visual representation of the recursively-defined complex data object; and
- the first panel of the GUI and the second panel of the GUI are displayed simultaneously.

* * * * *

UNITED STATES PATENT AND TRADEMARK OFFICE
CERTIFICATE OF CORRECTION

PATENT NO. : 11,100,075 B2  
APPLICATION NO. : 16/358205  
DATED : August 24, 2021  
INVENTOR(S) : Christopher Maloy et al.

Page 1 of 1

It is certified that error appears in the above-identified patent and that said Letters Patent is hereby corrected as shown below:

In the Claims

Column 30, Line 17, Claim 1, delete the "," after "XML".

Column 31, Line 8, Claim 9, delete the "," after "XML";
    Line 30, Claim 9, delete the "," after "XML".

Column 31, Line 44, Claim 11, delete the "," after "XML";
    Line 47, Claim 11, delete the "," after "XML".

Column 31, Line 54, Claim 12, delete the "," after "XML".

Column 32, Line 45, Claim 15, delete the "," after "XML".

Signed and Sealed this  
Fourth Day of January, 2022

Drew Hirshfeld  
*Performing the Functions and Duties of the*  
*Under Secretary of Commerce for Intellectual Property and*  
*Director of the United States Patent and Trademark Office*